US012801645B2

(12) United States Patent
Lee et al.

(10) Patent No.: US 12,801,645 B2
(45) Date of Patent: Nov. 17, 2026

(54) SYSTEMS AND METHODS FOR GENERATING INSTRUCTION FINE-TUNING DATASET FOR A GENERAL PURPOSE EMBEDDING MODEL

(71) Applicant: Google LLC, Mountain View, CA (US)

(72) Inventors: Jinhyuk Lee, Sunnyvale, CA (US); Zhuyun Dai, Sunnyvale, CA (US); Xiaoqi Ren, Kirkland, WA (US); Iftekhar Naim, Los Gatos, CA (US); Yi Luan, Kirkland, WA (US); Blair Yuxin Chen, San Jose, CA (US); Siddhartha Reddy Jonnalagadda, Sunnyvale, CA (US); Ming-Wei Chang, Redmond, WA (US); Daniel Matthew Cer, Santa Clara, CA (US); Gustavo Adolfo Hernandez Abrego, Mountain View, CA (US); Jeremy Robert Cole, San Francisco, CA (US); Colin Hearne Evans, San Mateo, CA (US); Yuzhe Zhao, San Francisco, CA (US); Pranay Bhatia, Palo Alto, CA (US); Rajvi Kapadia, Sunnyvale, CA (US); Riham Hassan Abdel-Moneim Mansour, Kirkland, WA (US); Raphael Dominik Hoffman, Los Altos, CA (US); Simon Kunio Tokumine, San Francisco, CA (US); Scott Bradley Huffman, Portola Valley, CA (US); Stephen Zachary Karukas, Seattle, WA (US); Michael Yiupun Kwong, San Jose, CA (US); Shu Zheng, Bellevue, CA (US); Yan Qiao, Millbrae, CA (US); Lukas Rutishauser, Kirkland, CA (US); Anand Rajan Iyer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/788,178

(22) Filed: Jul. 30, 2024

(65) Prior Publication Data

US 2025/0045316 A1 Feb. 6, 2025

Related U.S. Application Data

(60) Provisional application No. 63/517,795, filed on Aug. 4, 2023.

(51) Int. Cl.
*G06F 16/334* (2025.01)
*G06N 3/08* (2023.01)

(52) U.S. Cl.
CPC .......... *G06F 16/3344* (2019.01); *G06N 3/08* (2013.01)

(58) Field of Classification Search
CPC .. G06F 16/3344; G06F 18/213; G06F 18/214; G06F 40/35; G06N 3/08;
(Continued)

(56) References Cited

U.S. PATENT DOCUMENTS

| | | | | |
|---|---|---|---|---|
| 11,003,865 | B1 * | 5/2021 | Lee | G06F 40/56 |
| 2009/0248667 | A1 * | 10/2009 | Zheng | G06F 16/337 707/999.005 |

(Continued)

OTHER PUBLICATIONS

Schmaltz et al., Article:Coarse-to-Fine Memory Matching for Joint Retrieval and Classification, arxiv.org, arXiv:2012.02287 [cs.IR], https://doi.org/10.48550/arXiv.2012.02287; From: Allen Schmaltz Sun, Nov. 29, 2020 (Year: 2020).*

(Continued)

*Primary Examiner* — Evan Aspinwall
(74) *Attorney, Agent, or Firm* — McDonnell Boehnen Hulbert & Berghoff LLP

(57) ABSTRACT

An example method includes providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages. The method also includes receiving, from the sequence model and for the plurality of passages and based on the plurality of few-shot prompts, a respective plurality of predicted task-query pairs, the sequence model having been prompted to predict a task based on an input passage, and predict an output query relevant to the predicted task. The method further includes generating a synthetic training (Continued)

dataset comprising the plurality of passages and the respective plurality of predicted task-query pairs. The method also includes providing the synthetic training dataset.

21 Claims, 14 Drawing Sheets

(58) Field of Classification Search
CPC .......... G06N 20/00; G06N 3/092; G06N 5/04; G06N 3/094; G06N 3/091
USPC .......................................................... 707/728
See application file for complete search history.

(56) References Cited

U.S. PATENT DOCUMENTS

| | | | | |
|---|---|---|---|---|
| 2020/0311146 | A1* | 10/2020 | Guo | G06F 16/9532 |
| 2022/0084510 | A1* | 3/2022 | Peng | G10L 15/063 |
| 2022/0245056 | A1* | 8/2022 | Clement | G06N 3/045 |
| 2022/0405933 | A1* | 12/2022 | Tajbakhsh | G06N 3/096 |
| 2022/0414137 | A1* | 12/2022 | Sewak | G06F 16/3346 |
| 2023/0196191 | A1* | 6/2023 | Badjatiya | G06F 18/24133 706/12 |
| 2023/0259718 | A1* | 8/2023 | Salaam | G06F 40/58 704/2 |
| 2023/0297887 | A1* | 9/2023 | Gurgu | G06N 20/00 706/12 |
| 2023/0367818 | A1* | 11/2023 | Han | G06F 16/90335 |
| 2024/0070394 | A1* | 2/2024 | Peng | G06F 40/284 |
| 2024/0281446 | A1* | 8/2024 | Bathwal | G06F 16/345 |
| 2024/0289558 | A1* | 8/2024 | Muraoka | G06F 40/40 |
| 2024/0412039 | A1* | 12/2024 | Herard | G06N 3/08 |
| 2025/0028993 | A1* | 1/2025 | Marquez | G06N 20/00 |

OTHER PUBLICATIONS

Schmaltz et al., Article: “Coarse-to-Fine Memory Matching for Joint Retrieval and Classification”, arxiv.org, arXiv:2012.02287 [cs.IR] , https://doi.org/10.48550/arXiv.2012.02287; From: Allen Schmaltz Sun, Nov. 29, 2020 05:06:03 UTC (Year: 2020).*

Samarinas et al., Article: âLatent Retrieval for Large-Scale Fact-Checking and Question Answering with NLI trainingâ, Published in: 2020 IEEE 32nd International Conference on Tools with Artificial Intelligence (ICTAI) (Year: 2020).*

Schmaltz: “Coarse-to-Fine Memory Matching for Joint Retrieval and Classification”; arxiv.org, arXiv:2012.02287 [cs.IR], https://doi.org/10.48550/arXiv.2012.02287; From: Allen Schmaltz Sun, Nov. 29, 2020 (Year: 2020).*

“Introducing new Vertex AI text embedding models,” Google Cloud, AI & Machine Learning, https://cloud.google.com/blog/products/ai-machine-learning/google-cloud-announces-new-text-embedding-models, Apr. 10, 2024, 8 pages.

“MS Marco”, https://microsoft.github.io/msmarco/, Microsoft, 2024, 19 pages.

Asai et al., “Task-aware Retrieval with Instructions,” arXiv:2211.09260v2, Dec. 19, 2022.

Dai et al.,“Promptagator: Few-shot Dense Retrieval From 8 Examples,” arXiv:2209.11755v1, Sep. 23, 2022, 21 pages.

Lee et al., “Gecko: Versatile Text Embeddings Distilled from Large Language Models,” arXiv:2403.20327v1, Mar. 29, 2024, 18 pages.

Su et al, “One Embedder, Any Task: Instruction-Finetuned Text Embeddings,” arXiv:2212.09741v3, May 30, 2023, 18 pages.

Thakur et al., “Leveraging LLMs for Synthesizing Training Data Across Many Languages in Multilingual Dense Retrieval,” SWIM-IR, arXiv:2311.05800v2, Apr. 15, 2024, 26 pages.

Wang et al., “Self-Instruct: Aligning Language Models with Self-Generated Instructions,” arXiv:2212.10560v2, May 25, 2023, 23 pages.

* cited by examiner

600

| | | |
|---|---|---|
| 605 | Seed Passage ($p_{seed}$) | Recently, Marvel's The Eternals has become the topic of a great deal of online discourse, in part because of a scene where Phastos, a character blessed with the power of invention, helps humanity create the atomic bomb. As you can probably imagine, Twitter saw this and lost it. |
| | Generated Task ($t$) | *Given a query, find a passage that has the answer to the query.* |
| | Generated Query ($q$) | *who made the atomic bomb?* |
| | LLM-mined Positive ($p_1$) | The film follows the story of American scientist J. Robert Oppenheimer and his role in the development of the atomic bomb. |
| | LLM-mined Negative ($p_{20}$) | Amid deepening crises around the world with nuclear undertones, a research team from the University of Tokyo will hold a digital exhibition in New York to convey the testimonies of A-bomb survivors on the sidelines of the United Nations review conference of a nuclear nonproliferation treaty. |
| 610 | Seed Passage ($p_{seed}$) | moose - online shopping for canadians. The 2010 Vancouver Winter Olympics $75 gold coins were sold individually or in sets of three coins. The three different sets offered were Canadian Wildlife, Canadian Emblems and Vancouver 2010 Olympic Winter Games. |
| | Generated Task ($t$) | *Given a query, find a passage that might show up as a search result.* |
| | Generated Query ($q$) | *2010 olympic winter games* |
| | LLM-mined Positive ($p_1$) | The 2010 Winter Olympics return to North America on February 12th, when the world of snow sport enthusiasts descend upon one of North America's most beautiful cities, Vancouver. |
| | LLM-mined Negative ($p_{20}$) | Published: 9:42pm, 12 Feb, 2018 High winds caused havoc at the Pyeongchang Winter Games on Monday as Olympics chief Thomas Bach dismissed concerns North Korea had tried to "hijack" the competition for political gain. |
| 615 | Seed Passage ($p_{seed}$) | Tagged: Batman, Robin, DC, DC Comics, Comics, ... |
| | Generated Task ($t$) | *Given a query, find a passage that allows you to check whether the query is true or not.* |
| | Generated Query ($q$) | *Batman is from DC comics* |
| | LLM-mined Positive ($p_1$) | The Batman is an American superhero film based on the DC Comics character of the same name. Produced by DC Films and distributed by Warner Bros. Pictures, it is a reboot of the Batman film franchise. |
| | LLM-mined Negative ($p_{20}$) | "One of my employees wants to dress up in Batman attire," Gaskins said. "As long as he's at work, I told him it was fine." New York Times News Service contributed to this report. |

FIG. 6

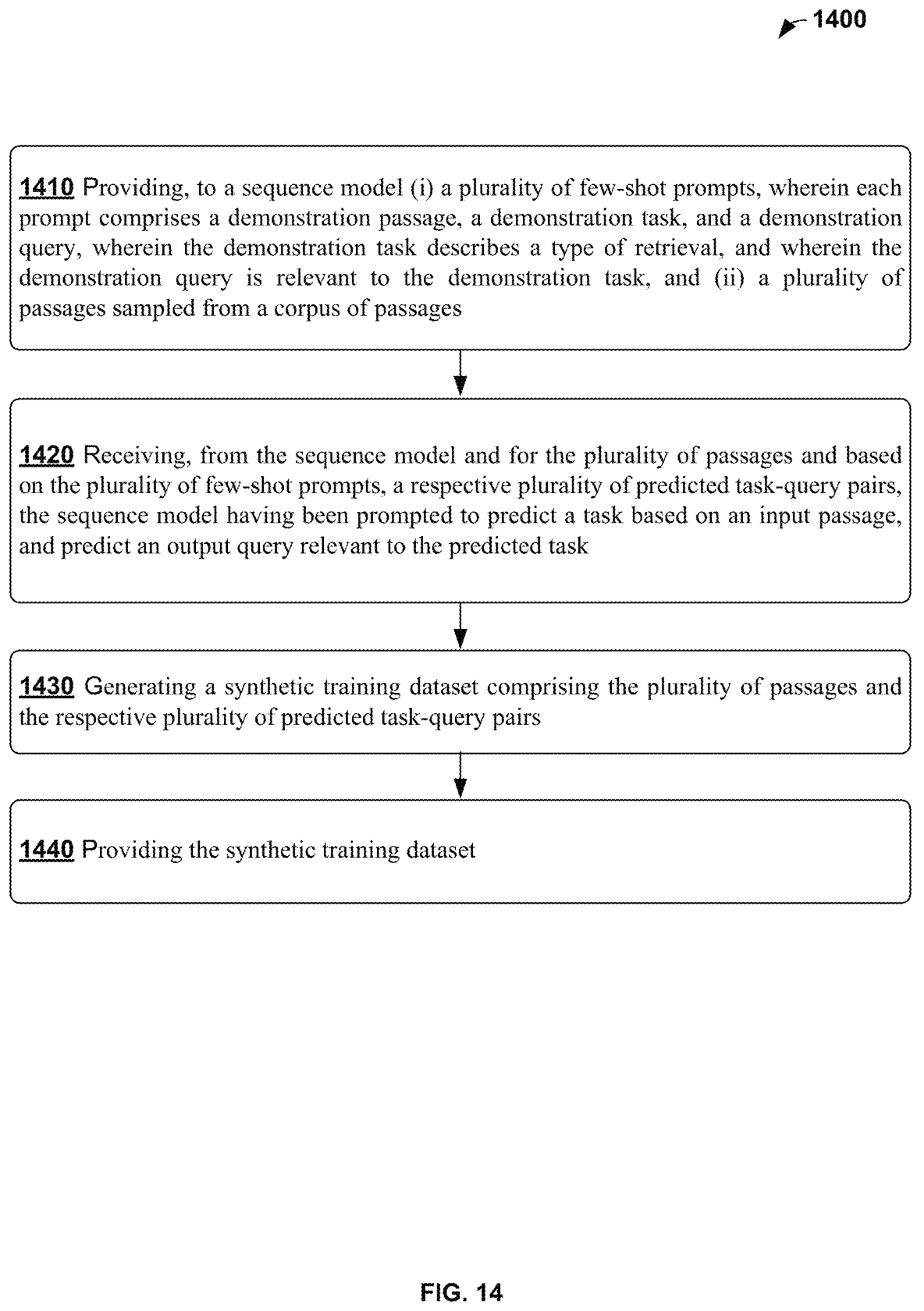

1400

1410 Providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages

↓

1420 Receiving, from the sequence model and for the plurality of passages and based on the plurality of few-shot prompts, a respective plurality of predicted task-query pairs, the sequence model having been prompted to predict a task based on an input passage, and predict an output query relevant to the predicted task

↓

1430 Generating a synthetic training dataset comprising the plurality of passages and the respective plurality of predicted task-query pairs

↓

1440 Providing the synthetic training dataset

FIG. 14

SYSTEMS AND METHODS FOR GENERATING INSTRUCTION FINE-TUNING DATASET FOR A GENERAL PURPOSE EMBEDDING MODEL

CROSS REFERENCE TO RELATED APPLICATIONS

This application claims priority to U.S. Provisional Patent Application No. 63/517,795, filed on Aug. 4, 2023, which is hereby incorporated by reference in its entirety.

BACKGROUND

Many modern machine learning models utilize embedding models. For example, embedding models are used by several natural language processing (NLP) applications, such as information retrieval, text similarity, classification, and clustering.

SUMMARY

Text embedding models represent natural language as dense vectors, positioning semantically similar text near each other within the embedding space. These embeddings are commonly used for a wide range of downstream tasks including document retrieval, sentence similarity, classification, and clustering. Instead of building separate embedding models for each downstream task, various approaches seek to create a single embedding model supporting many tasks. Such general-purpose text embedding models rely on large amounts of training data to comprehensively cover desired domains and skills. Some embedding efforts have focused on using extensive collections of training examples.

State-of-the-art embedding models rely on supervised training data. However, such supervised datasets may be limited in their diversity and/or quality, and may not be compliant with existing privacy and/or data protection standards. Large language models (LLMs) can offer a viable alternative, as they contain vast knowledge across various domains and are known to be exceptional few-shot learners. Some approaches demonstrate the effectiveness of using LLMs for synthetic data generation, but the focus of such approaches has primarily been on augmenting existing human-labeled data and/or on improving performance in specific domains.

As described herein, a large, high-quality, and substantially compliant (e.g., legally, ethically, etc.) dataset for instruction-tuning embedding models is provided, through synthetic data generation from large language models (LLM). In some aspects, a highly versatile yet efficient embedding model, powered by the vast world knowledge of LLMs is described. The approach described herein leverages insights from knowledge distillation to create a two-step LLM-powered embedding model. Starting with a large corpus of (unlabeled) passages, a few-shot prompted LLM is utilized to generate a relevant task and query for each passage. The concatenated task and query is embedded using a pre-trained embedding model to obtain nearest neighbor passages. Such a synthetic task and query generation step enables generating high quality data that includes a query, task, and passage, for training text embedding models. In some embodiments, an LLM may be used to re-rank the passages and associate relevancy scores with the passages. The passages may be classified as positive and negative passages based on the relevancy scores. The reranking step enhances the quality of the training dataset as the best passage to answer the generated query may differ from the original source passage.

In one aspect, a computer-implemented method is provided. The method includes providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages. The method also includes receiving, from the sequence model and for the plurality of passages and based on the plurality of few-shot prompts, a respective plurality of predicted task-query pairs, the sequence model having been prompted to predict a task based on an input passage, and predict an output query relevant to the predicted task. The method further includes generating a synthetic training dataset comprising the plurality of passages and the respective plurality of predicted task-query pairs. The method also includes providing the synthetic training dataset.

In a second aspect, a device is provided. The device includes one or more processors and data storage. The data storage has stored thereon computer-executable instructions that, when executed by one or more processors, cause the device to carry out functions. The functions include providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages. The functions also include receiving, from the sequence model and for the plurality of passages and based on the plurality of few-shot prompts, a respective plurality of predicted task-query pairs, the sequence model having been prompted to predict a task based on an input passage, and predict an output query relevant to the predicted task. The functions further include generating a synthetic training dataset comprising the plurality of passages and the respective plurality of predicted task-query pairs. The functions also include providing the synthetic training dataset.

In a third aspect, a computer program is provided. The computer program includes instructions that, when executed by a computer, cause the computer to carry out functions. The functions include providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages. The functions also include receiving, from the sequence model and for the plurality of passages and based on the plurality of few-shot prompts, a respective plurality of predicted task-query pairs, the sequence model having been prompted to predict a task based on an input passage, and predict an output query relevant to the predicted task. The functions further include generating a synthetic training dataset comprising the plurality of passages and the respective plurality of predicted task-query pairs. The functions also include providing the synthetic training dataset.

In a fourth aspect, an article of manufacture is provided. The article of manufacture includes one or more computer readable media having computer-readable instructions stored thereon that, when executed by one or more processors of a device, cause the device to carry out functions. The functions include providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages. The functions also include receiving, from the sequence model and for the plurality of passages and based on the plurality of few-shot prompts, a respective plurality of predicted task-query pairs, the sequence model having been prompted to predict a task based on an input passage, and predict an output query relevant to the predicted task. The functions further include generating a synthetic training dataset comprising the plurality of passages and the respective plurality of predicted task-query pairs. The functions also include providing the synthetic training dataset.

In a fifth aspect, a system is provided. The system includes means for providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages; means for receiving, from the sequence model and for the plurality of passages and based on the plurality of few-shot prompts, a respective plurality of predicted task-query pairs, the sequence model having been prompted to predict a task based on an input passage, and predict an output query relevant to the predicted task; means for generating a synthetic training dataset comprising the plurality of passages and the respective plurality of predicted task-query pairs; and means for providing the synthetic training dataset.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 6 illustrates an example table that includes examples of a seed passage, a predicted task-query pair, and corresponding positive and negative passages, in accordance with example embodiments.

FIG. 14 is flowchart of a method, in accordance with example embodiments.

DETAILED DESCRIPTION

Figure 1:
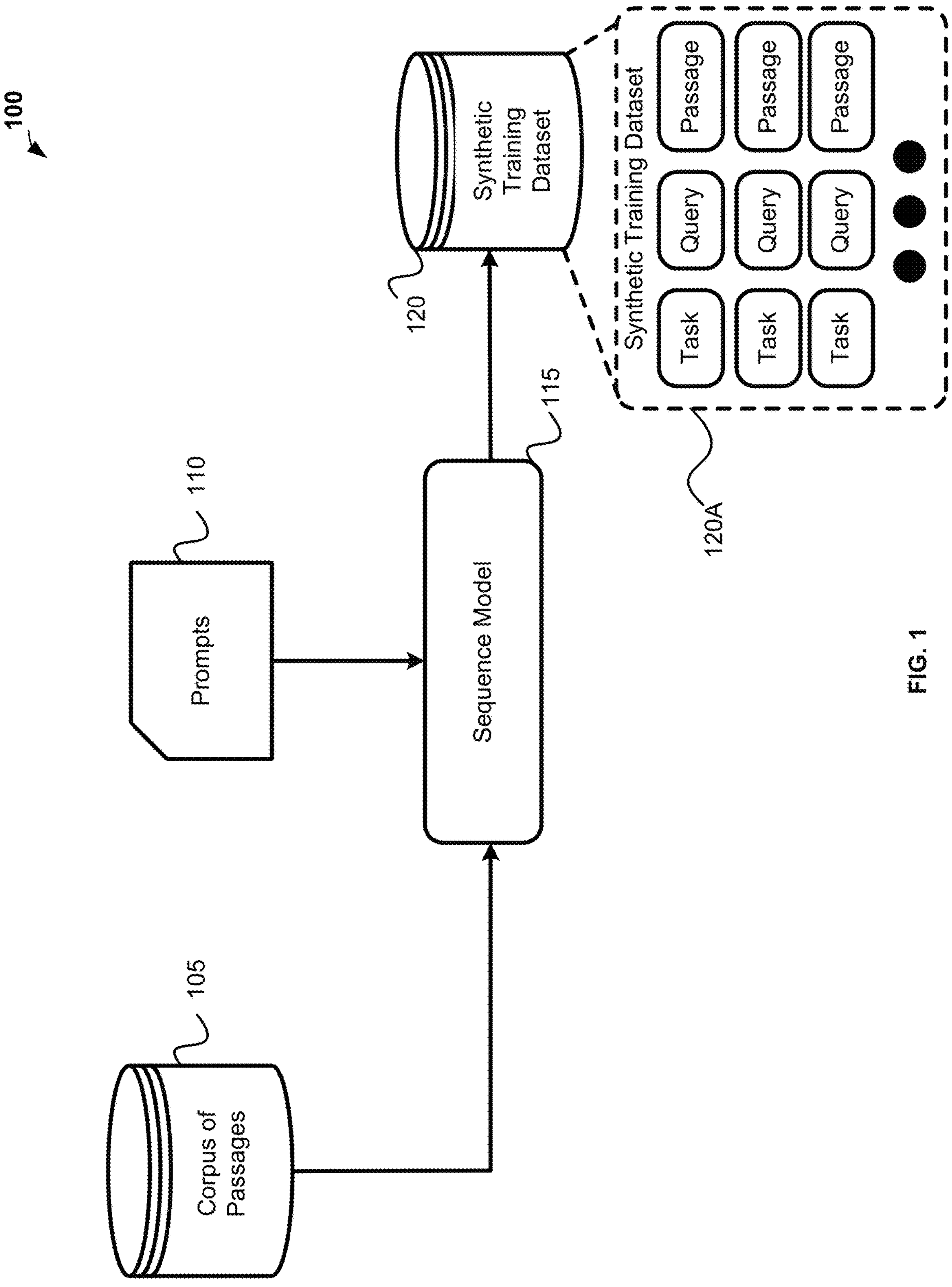
FIG. 1 illustrates an overview of an example fine-tuning dataset generation workflow, in accordance with example embodiments.

Text embeddings convert textual inputs into uniform-sized vectors, supporting downstream tasks such as semantic similarity, information retrieval, clustering, and classification. Several embedding models have been proposed, including, for example SBERT, Universal Sentence Encoder, and Sentence T5. These models attempt to provide general purpose embeddings suitable for various Natural Language Processing (NLP) tasks. Despite an attempt to be general-purpose models, studies indicate that these embedding models struggle to generalize across tasks and domains.

For example, InstructOR for instruction-fine-tuned text embeddings, trains a multi-task embedding model with supervised data from various tasks. Human-written instructions for the tasks are part of the input in the training data, to teach the model to follow instructions. InstructOR relies on collecting pre-existing supervised data from available retrieval and/or embedding datasets. As a result, InstructOR may be limited by the quality and diversity of existing supervised data, e.g., existing datasets may cover limited tasks and languages. In addition, the data may not be suitable for commercial use.

Another approach, Task-Adaptive Reference Transformation (TART), for task-aware retrieval with instructions, has a similar approach as InstructOR, and shares many of the same shortcomings. Promptagator is a few-shot dense retrieval from a few examples (e.g., 8 examples). This approach uses task-specific few-shot demonstrations to generate synthetic retrieval training data for a particular task. However, these datasets do not provide a recipe for training a single general-purpose embedding model. Instead, for each retrieval task, this approach collects a few demonstrations, runs query generation, and trains a new retriever.

A related approach is Self-Instruct that aligns language models with self-generated instructions. This approach can generate a diverse set of instructions for fine-tuning language models. However, Self-Instruct does not apply to retrieval or embedding tasks.

When applying text embedding models to new tasks and domains, it is preferable to have relevant queries and labels for the target domains. However, such relevant queries and labels are often unavailable or prohibitively expensive to collect. Some approaches generate synthetic queries by few-shot prompting LLMs to create a domain-specific training dataset.

An important component of contrastive learning is to find proper negative examples for a query. Some proposed approaches attempt to select hard negative examples from a large corpus using an asynchronously-updated approximate nearest neighbor index. Other approaches have denoised the hard negatives based on confidence scores or distilled knowledge from cross-attention re-rankers into the dual-encoders.

Different retrieval tasks may have different intentions. For example, given a search query, users may want to find a similar query, or they may want to read a passage that directly answers the query. Some retriever models may be configured to change the retrieval behavior for different intents. For example, in a "retrieval with instructions" approach, a dense retriever may be trained to follow an instruction that was provided along with the query. Other approaches rely on a two-step prompt to encourage the diversity of the synthetic data: first prompting an LLM to generate a task and then generating an example (query, positive passage, and negative passage) based on the task.

Embedding models are used by many NLP applications, such as information retrieval, text similarity, classification and clustering. Accordingly, there is a need to provide a single, general-purpose embedding model that can follow human instructions to work on a variety of tasks. A versatile embedding model is described that can be trained on a synthetic training dataset obtained from an LLM and a large and diverse corpus of passages encompassing a wide variety of task types. The approach is based on generating task-query pairs from a corpus of passages to increase the diversity of the synthetic dataset. In some embodiments, the corpus of passages may be from the web, causing the synthetic training dataset to be based on real user-facing content. As described herein, more general-purpose knowledge of LLMs may be distilled into a text embedding model, resulting in a versatile text embedding model that achieves strong performance. Also, for example, more relevant positive examples are found for a query while finding useful hard negatives as well. The synthetic dataset may be referred to herein as a Few-shot Prompted Retrieval (Fret) dataset. Fret may be generated based on a two-stage approach that uses LLMs.

Another aspect of this application relates to a synthetic training dataset for a multilingual retrieval model. Uneven and scarce training data availability (e.g., human-supervised training data) across multiple languages pose numerous challenges for dense retrieval models in multilingual retrieval. For example, collecting human annotations for training data generation is generally not efficiently scalable, as it is cumbersome to search and hire native speakers, verify language proficiencies and standards, and so forth. Additionally, human annotators can be expensive, thereby requiring a large annotation budget for generating a sufficient amount of training pairs. Multilingual query generation is a complex task that requires understanding of semantic mappings of words across languages, similar to machine translation. Also, for example, standard prompt templates can lead the LLM to generate either extractive or uninformative queries (e.g., a query that can be easily answered using the first (or last) few words in the passage) across languages.

Described herein is a synthetic retrieval training dataset (sometimes referred to herein as SWIM-IR) containing high to very-low resource languages for fine-tuning multilingual dense retrievers without requiring any human supervision. To construct SWIM-IR, a summarize-then-ask prompting (SAP) technique is described, where the sequence model generates a textual summary prior to the query generation step. SAP assists the sequence model in generating informative queries in a target language. SAP improves a quality of the generated query. An optimized query generation process described herein may involve two stages: (i) summary extraction, which identifies the relevant information from the long input passage and extracts the best representative sentences as the summary, and (ii) query generation, which generates a multilingual query relevant for the input passage, using the extracted summary (first stage) as the intermediate step. SAP highlights the relevant information within the passage and produces difficult (i.e., informative) queries in the target language. In some embodiments, synthetic multilingual (both monolingual and cross-lingual) dense retrieval models, sometimes referred to herein as SWIM-X, may be developed. The models may use an mT5 (base) as a backbone and fine-tune on SWIM-IR.

Synthetic Instruction-Tuning Data Generation for an Embedding Model

Traditional approaches for training embedding models often rely on large, manually labeled datasets. However, creating such datasets is time-consuming, expensive, and often results in undesirable biases and lack of diversity. Generation of a synthetic dataset for training multi-task text embedding models is described, that leverages the power of LLMs through a two-step distillation process.

The approach described herein generates synthetic queries from passages for training a text embedding model. In some embodiments, given a random passage, a sequence model (e.g., a large language model (LLM), and/or a large multimodal model (LMM), such as LLMs such as Gemini, Gemini Nano, Gemini XS, Program-aided Language Models (PaLM), and so forth) may be used to generate a query as well as a task description (or instructions), where the task descriptions define the type of retrieval task, such as question-answering, search, fact checking, and so forth. One of the challenges of using manually crafted queries is to ensure that the queries cover a diverse set of tasks and linguistic patterns. With LLMs, these variables may be relatively easy to control as the prompt may be designed to specify the diversity. For example, few-shot prompts may be used to control the diversity of queries.

FIG. 1 illustrates an overview of an example fine-tuning dataset generation workflow 100, in accordance with example embodiments. Some embodiments involve providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages. For example, prompts 110 and a plurality of passages sampled from a corpus of passages 105 may be provided to the sequence model 115.

Some embodiments involve receiving, from the sequence model and for the plurality of passages and based on the plurality of few-shot prompts, a respective plurality of predicted task-query pairs, the sequence model having been prompted to predict a task based on an input passage, and predict an output query relevant to the predicted task. For example, the sequence model 115 may be instructed to read a sampled web passage from the corpus of passages 105, and generate both a task description and a relevant query for the task. This may be summarized below:

$$\text{Few}-\text{shot exemplars}+\text{passage}\rightarrow\text{task}+\text{query} \quad \text{(Eqn. 1)}$$

More formally, the relation may be described as:

$$LLM(P_{QG}, p_{seed})\rightarrow(t, q) \quad \text{(Eqn. 2)}$$

where $p_{seed}$ is a passage drawn randomly from a corpus of passages (e.g., a web corpus C), and $P_{QG}$ is a fixed prompt. The $P_{QC}$ is generally identical for every example and includes few-shot examples and instructions. The sequence model 115 generates a task description t that describes a type of retrieval. For example, a question answering task may be "given a query, find a passage that has the answer to the query,' or a fact-checking task may be 'given a query, find a passage that allows you to check whether the query is true or not.' The sequence model also generates a query q that aligns with the task. By sampling over such free-form task descriptions, the sequence model 115 may be guided to produce a wide range of queries. These pairs may be later used to train embedding models by teaching the models to associate a query and its corresponding instructions with the target passage.

An example prompt 110 may be "FRET_PROMPT="""Given a passage, let's come up with a task where the provided passage is the right answer. Then, what would the query be like? Make sure the query contains some important keywords of the passage, but not the exact copy of the title or the passage."

With reference to Eqn. 1 above, a "passage" from the corpus of passages 105 may correspond to "The new "Thor: Ragnarok" movie trailer shows a new adventure of Chris Hemsworth as Thor, the Son of Odin. Previously, before Marvel released the plot details, many rumors speculated what would happen in the movie, and so far, it seems those rumors were true. It is actually based on the comics, not very surprising if those die-hard marvel comics fans know what kind of fate Chris Hemsworth's character will have in the "Thor: Ragnarok" and other Marvel Cinematic Universe movies. One of the most awaited scenes for the fans is the battle between Thor and his former co-Avenger the Hulk . . . ."

Again with reference to Eqn. 1 above, a "task" may correspond to "given a query, find a passage that has the answer to the query." And a "query" may correspond to "will the new Thor movie have Thor fight the Hulk?"

Additional passages from the corpus of passages 105 may be provided. For example, various types of passages and retrieval tasks may be provided as few-shot examples in the prompt 110, so that when applied to new passages, diverse tasks and queries may be generated. Accordingly, an embedding model trained on such data may be configured to have a high performance on several different types of tasks.

In some embodiments, starting from human written examples, sampled few-shot examples may be used from an initial pool when a task and a query are generated for each passage. Such an example pool may be expanded by adding automatically generated examples while adhering to conditions that ensure diversity of the training examples.

Some embodiments involve generating a synthetic training dataset 120 (also sometimes referred to herein as Fret) comprising the plurality of passages and the respective plurality of predicted task-query pairs, as indicated by representation 120A. The diversity of FRet 120 may depend on one or more factors. For example, the corpus of passages 105 may include a web corpus. A web corpus inherently contains a variety of topics as well as styles of writing, such as blog posts, news, Wikipedia-like content, and forum posts. Also, for example, by adding many diverse task descriptions in the prompt 110, the sequence model 115 may be guided to generate more diverse task descriptions and therefore more diverse queries. The approach may be applied to any corpus of passages 105.

The term "prompt" as used herein generally refers to an input that may be provided to a sequence model to generate an output. The prompt may be multilingual. Also, for example, the prompt may be a single phrase, or a combination of one or more phrases. A prompt may be an initial prompt, or a prompt that continues a previously initiated conversation with the sequence model. A conversation may be a sequence of inputs to, and outputs from, the sequence model.

The term "sequence model" as used herein, may generally refer to any machine learning model that is capable of performing tasks, such as, for example, text and speech processing (e.g., speech recognition, text-to-speech, speech-to-text, speech segmentation, text segmentation, optical character recognition, etc.), part-of-speech tagging, segmentation (e.g., speech segmentation, text segmentation, morphological segmentation, etc.), syntactic analysis, named entity recognition (NER), context analysis, discourse analysis, semantic understanding (e.g., relational semantics), sentiment analysis, word-sense disambiguation, entity linking, summarization, natural language understanding (NLU), natural language generation (NLG), and so forth. In some embodiments, the underlying architecture for the sequence model may be transformer based, although other types of architectures may be used as well.

In some embodiments, the sequence model 115 may include one or more sequence models, and a particular sequence model may be selected based on a type of task (e.g., classification, question-answering, search, etc.). The sequence model 115 may include, for example, language representation models that generate natural language outputs, large language models (LLMs), large multimodal models (LMM) that can process and generate content in multiple modalities, such as text, audio, image, video, software code, and other types of data such as sensory data, multilingual models that can take input and generate output in multiple languages, etc. Also, for example, the sequence model 115 may include zero-shot models, small-shot models, few-shot models, and so forth, that are not trained based on task-specific training data, and can perform multiple tasks (e.g., a model with multiple, independently trainable task-specific output heads). As another example, the sequence model 115 may include fine-tuned models that are trained to perform specific tasks. In some embodiments, the sequence model 115 may take an input in a first one or more modalities and generate outputs in a second one or more modalities. Also, for example, the sequence model 115 may take input in a first one or more languages and generate an output in a second one or more languages.

In some embodiments, a text corpus (e.g., a collection of text sources) for NLP may be used for the corpus of passages 105 to generate synthetic data from. The text corpus may include a plain text corpus (for unsupervised training), or a corpus with annotated text (for supervised training). For example, for such a corpus of passages 105, millions of passages may be randomly sampled. By running a prompt on new passages, a large set of synthetic (task, query, passage) data may be collected.

Figure 2:
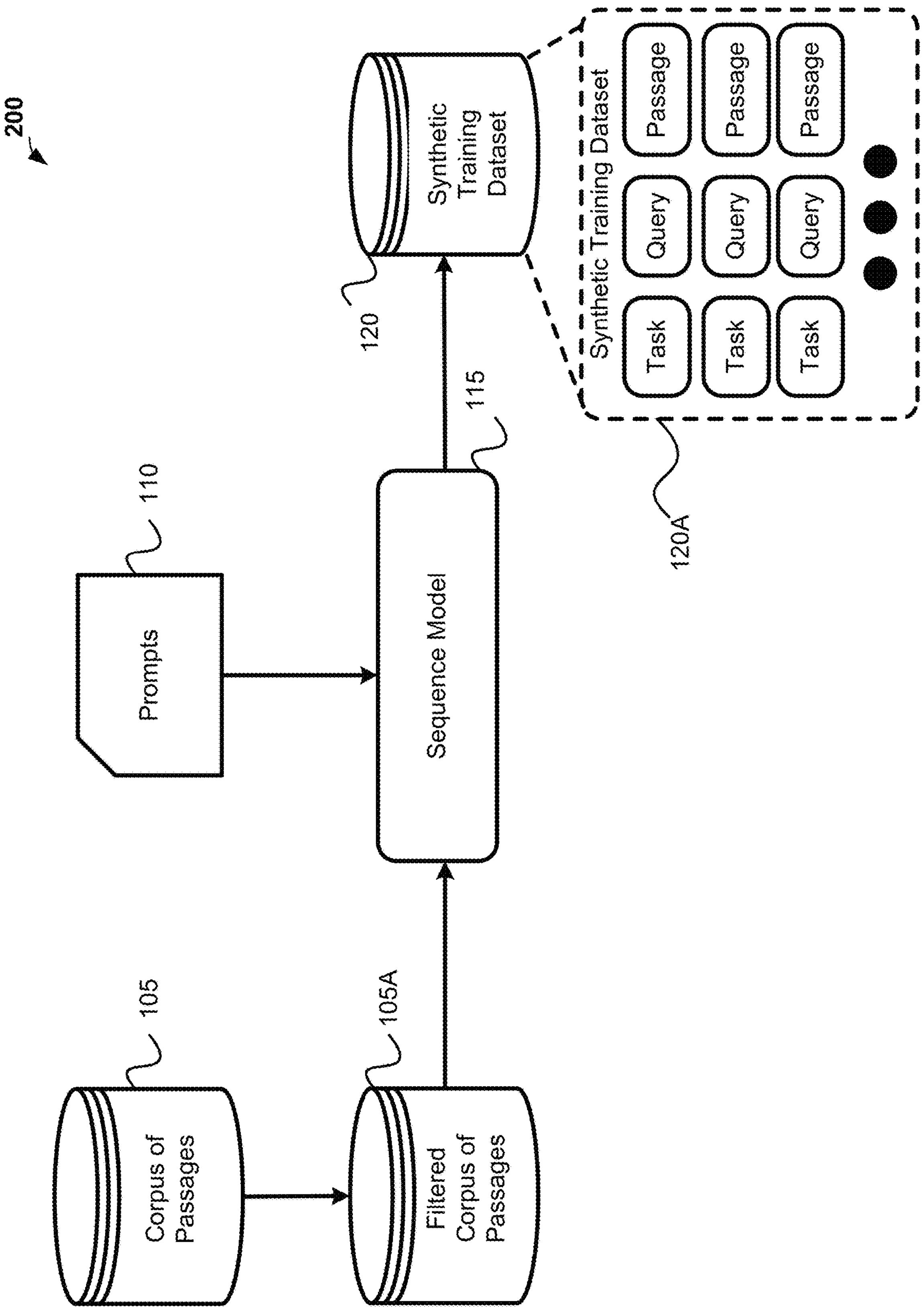
FIG. 2 illustrates an example filtering process for fine-tuning dataset generation, in accordance with example embodiments.

FIG. 2 illustrates an example filtering process 200 for fine-tuning dataset generation, in accordance with example embodiments. The components in FIG. 2 are indicated by the same reference numerals as in the counterpart components in FIG. 1. Some embodiments involve filtering the corpus of passages to remove passages that do not conform to content standards, and wherein the plurality of passages are sampled from the filtered corpus of passages. For example, to provide passages with a desired level of quality, a passage filtering process may be run based on specific rules and large language models to generate a filtered corpus of passages 105A. In some embodiments, the filtering may be performed by a machine learning model trained based on the content standards. For example, classifiers may be used to classify content and filter out harmful content. Generally, content standards may relate to prohibited speech, harmful content, illegal content, adult content, content related to sensitive subjects, and so forth. In some embodiments, content standards may relate to filtering passages based on topics, keywords, etc.

Figure 3:
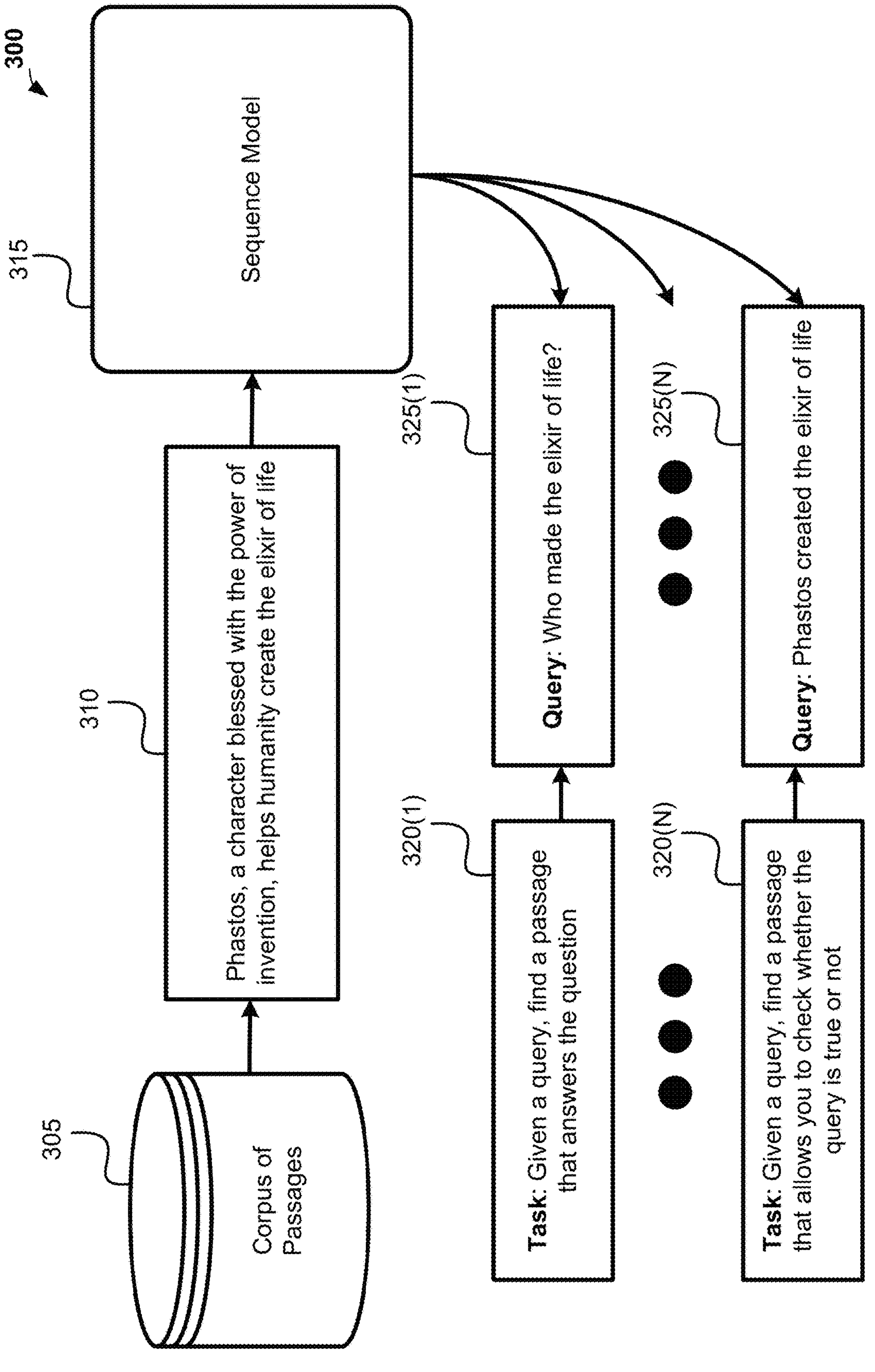
FIG. 3 illustrates an example generation process for a task-query pair, in accordance with example embodiments.

FIG. 3 illustrates an example generation process 300 for a task-query pair, in accordance with example embodiments. A passage 310 may be sampled from a corpus of passages 305. Passage 310 may be "Phastos, a character blessed with the power of invention, helps humanity create the elixir of life." Passage 310 may be provided to sequence model 315. In response to instructions to predict a task based on an input passage, and predict an output query relevant to the predicted task, sequence model 315 may generate, for a plurality of passages from the corpus of passages 305, a respective plurality of predicted task-query pairs. For example, a first pair may include a first task 320(1) such as a question-answering task: "given a query, find a passage that answers the question," and a corresponding first query 325(1) relevant to the predicted first task 320(1). For example, the first query 325(1) may be "who made the elixir of life?"

As another example, another pair may include another task 320(N) such as a fact-checking task: "given a query, find a passage that allows you to check whether the query is true or not," and a corresponding another query 325(N) relevant to the predicted another task 320(N). For example, the other query 325(N) may be "Phastos created the elixir of life?"

Figure 4:
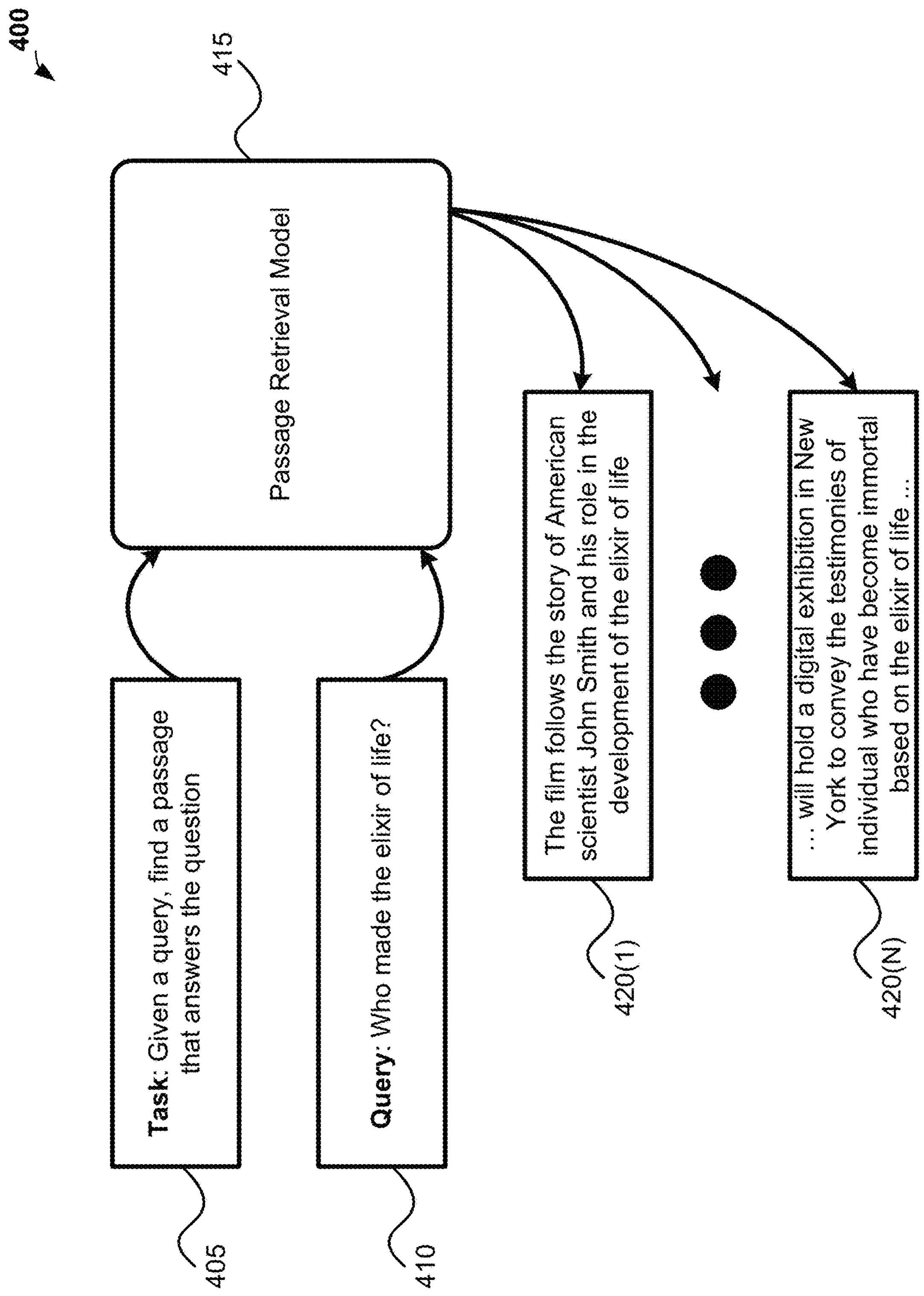
FIG. 4 illustrates an example passage retrieval process for a task-query pair, in accordance with example embodiments.

FIG. 4 illustrates an example passage retrieval process 400 for a task-query pair, in accordance with example embodiments. Some embodiments involve providing the plurality of predicted task-query pairs to a passage retrieval model, the passage retrieval model having been trained to output, for a given predicted task-query pair, respective one or more nearest neighbor passages of the corpus of passages. For example, given a task 405, such as "given a query, find a passage that answers the question," and a query 410, such as "who made the elixir of life?" a passage retrieval model 415 may generate one or more nearest neighbor passages. For example, passage retrieval model 415 may retrieve top N neighbors P={p(1), . . . , p(N)} from the corpus of passages for a given generated query q. The top N neighbors may include, for example, a first passage 420(1): "The film follows the story of American scientist John Smith and his role in the development of the elixir of life." The top N neighbors may include, for example, another passage 420 (N): " . . . will hold a digital exhibition in New York to convey the testimonies of individuals who have become immortal based on the elixir of life . . . " and so forth. In some embodiments, the passage retrieval model 415 may be an initial embedding model trained with (q, $p_{seed}$) pairs, treating in-batch passages as random negatives. Some embodiments involve receiving, from the passage retrieval model 415 and for the plurality of predicted task-query pairs, the respective one or more nearest neighbor passages.

Many models that utilize synthetic queries are trained with (q, $p_{seed}$) pairs that assumes that $p_{seed}$ is a good positive target. While this is likely true in most cases, it is likely that there are more relevant passage than $p_{seed}$ somewhere in the corpus of passages. As has been described, a probability for a task-query pair (t, q), denoted P(t, q|$p_{seed}$), may be sampled from the sequence model. However, this does not guarantee that $p_{seed}$ maximizes P(t, q|$p_{seed}$) over all the passages in the corpus of passages. Indeed, experimental results indicate that generated queries often focus on a particular aspect of a relatively long passage. Accordingly, sequence models may be leveraged to discover more relevant positive passages along with a good hard negative for the generated query.

Figure 5:
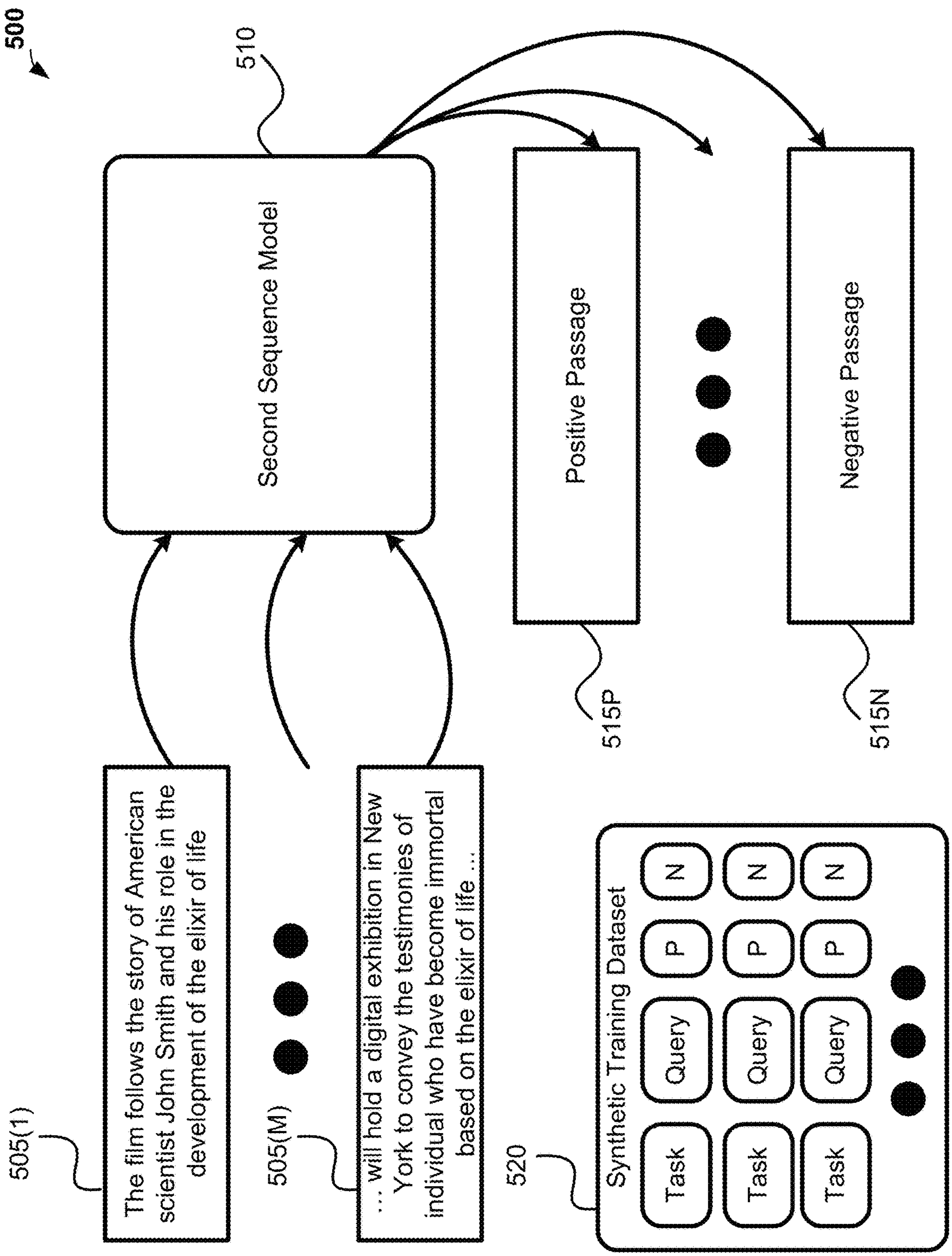
FIG. 5 illustrates an example generation process for positive and negative passages, in accordance with example embodiments.

FIG. 5 illustrates an example generation process 500 for positive and negative passages, in accordance with example embodiments. Some embodiments involve providing, to a second sequence model, the plurality of predicted task-query pairs, and the respective one or more nearest neighbor passages. For example, the top M neighbors P={p(1), . . . , p(M)} may be provided to the second sequence model. In some embodiments, the second sequence model may be the same as the sequence model used to generate the synthetic training dataset.

For example, a first passage 505(1) of the top M neighbors may be "The film follows the story of American scientist John Smith and his role in the development of the elixir of life." Another passage 505(M) of the top M neighbors may be " . . . will hold a digital exhibition in New York to convey the testimonies of individuals who have become immortal based on the elixir of life . . . " and so forth. Such embodiments further involve receiving, from the second sequence model and for each predicted passage of the one or more predicted nearest neighbor passages, an associated relevance score indicative of a relevance of the predicted passage to a predicted query. For example, second sequence model 510 may generate relevance scores for the top M neighbors.

In some embodiments, the retrieved passages (e.g., top M neighbors) may be ranked based on the relevance to the query. For example, a high relevance score may be indicative of a high relevance to the query, and a low relevance score may be indicative of a low relevance to the query. Such embodiments also involve classifying, for each task-query pair of the plurality of predicted task-query pairs and based on associated relevance scores, the one or more nearest neighbor passages into a first collection of positive passages and a second collection of negative passages, wherein a positive passage is indicative of a high relevance to a predicted query, and wherein a negative passage is indicative of a low relevance to the predicted query. For example, the first collection of positive passages 515P may include passages with a high relevance (e.g., high relevance scores) to the predicted query. Also, for example, the second collection of negative passages 515N may include passages with a low relevance (e.g., low relevance scores) to the predicted query.

In some embodiments, the classifying involves applying one or more few-shot prompted ranking functions. In some embodiments, the one or more few-shot prompted ranking functions include query likelihood or relevance classification. For example, query likelihood uses an LLM to measure the log-likelihood of a generated query q given a passage p, also denoted as QL(q,p)=LLM(q|p, $P_{QL}$). Herein, $P_{QL}$ is a prompt containing an instruction for judging query likelihood and several few-shot examples of relevant query and passage pairs. Also, for example, relevance classification uses an LLM to measure the log-likelihood of a specific relevance label given the query q and a passage p, also denoted as, RC(q, p)=LLM(label|q, p, $P_{RC}$), where $P_{RC}$ is a prompt with few-shot examples for grading the relevance of each query-passage pair. The prompts $P_{QL}$ and $P_{RC}$ may be identical for every example. Experimental results indicate that each prompting method (e.g., $P_{QL}$ and $P_{RC}$) excels in different tasks. Some embodiments involve ensembling the rankings from the two different prompting results with the standard Reciprocal Rank Fusion (RRF) approach, to determine a ranking function R(q, p). Generally, the ensemble may greatly improve the robustness of an embedding model across diverse tasks.

FIG. 6 illustrates an example table 600 that includes examples of a seed passage, a predicted task-query pair, and corresponding positive and negative passages, in accordance with example embodiments. Table 600 showcases some advantages of LLM-based relabeling (e.g., based on relevance scores). Table 600 provides examples of an original seed passage, a generated task and query, and LLM-mined positive and negative passages. While the intent of each query q aligns with each task t LLM-mined positive is often more relevant than the seed passage for the generated query. As illustrated, the LLM generates diverse tasks and queries by conditioning on seed passages $p_{seed}$. Also, for example, table 600 highlights the ability of an LLM to find a passage (p1) that provides a more direct and relevant answer to the generated query than the seed passage ($p_{seed}$). Also, for example, LLM-ranked hard negatives may make a challenging task of understanding nuanced differences. The examples demonstrate how the 2-step LLM distillation process can effectively bring an LLM's diverse domain knowledge and global ranking preferences into a text embedding model.

Given the scores from LLMs after ensembling, the set of passages P may be indexed according to their ranking, denoted as $P=\{p_1, \ldots, p_N\}$ where if i<j, then $R(q, p_i) \geq R(q, p_j)$. In some embodiments, a new positive target may be selected as:

$$p^+ = R(q, p) = p_1 \quad \text{(Eqn. 3)}$$

Generally, $p^+$ can be different from $p_{seed}$ and can convey an approximation to the global preference of the LLM over an entire corpus.

Table 600 illustrates three example sets including a seed passage, a predicted task-query pair, and corresponding positive and negative passages. Table 600 lists examples where $p^+$ differs from $p_{seed}$, and demonstrates that the pair ($q$, $p_{seed}$) may be sub-optimal and there can be more relevant passages for q globally. Generally, relabeling of the positive passages (e.g., $p^+ \neq p_{seed}$) may occur for about 15% in the synthetic training dataset.

In a similar manner, the relevance scores may be used to select hard negative passages. One option to select a hard negative passage may be to select the lowest scoring negative passage, i.e. $p^- = p_N$. Another option to select a hard negative passage may be to sample from the remaining nearest neighbors, such as, for example, $p^- \sim P \backslash \{p^+\}$.

First example set 605 of table 600 includes a seed passage "Recently, Marvel's The Eternals has become the topic of a great deal of online discourse, in part because of a scene where Phastos, a character blessed with the power of invention, helps humanity create the atomic bomb. As you can probably imagine, Twitter saw this and lost it." The generated task is "Given a query, find a passage that has the answer to the query," and the generated query is "who made the atomic bomb?" The LLM-mined positive passage (e.g., with a highest relevance score) is "The film follows the story of American scientist J. Robert Oppenheimer and his role in the development of the atomic bomb." The LLM-mined positive passage is different from the seed passage. The LLM-mined negative passage (e.g., with a lowest relevance score) is "Amid deepening crises around the world with nuclear undertones, a research team from the University of Tokyo will hold a digital exhibition in New York to convey the testimonies of A-bomb survivors on the sidelines of the United Nations review conference of a nuclear nonproliferation treaty."

Second example set 610 of table 600 includes a seed passage "moose-online shopping for canadians. The 2010 Vancouver Winter Olympics $75 gold coins were sold individually or in sets of three coins. The three different sets offered were Canadian Wildlife, Canadian Emblems and Vancouver 2010 Olympic Winter Games." The generated task is "Given a query, find a passage that might show up as a search result," and the generated query is "2010 olympic winter games." The LLM-mined positive passage (e.g., with a highest relevance score) is "The 2010 Winter Olympics return to North America on February 12th, when the world of snow sport enthusiasts descend upon one of North America's most beautiful cities, Vancouver." The LLM-mined positive passage is different from the seed passage. The LLM-mined negative passage (e.g., with a lowest relevance score) is "Published: 9:42 pm, 12 Feb. 2018 High winds caused havoc at the Pyeongchang Winter Games on Monday as Olympics chief Thomas Bach dismissed concerns North Korea had tried to "hijack" the competition for political gain."

Third example set 615 of table 600 includes a seed passage "Tagged: Batman, Robin, DC, DC Comics, Comics, . . . " The generated task is "Given a query, find a passage that allows you to check whether the query is true or not," and the generated query is "Batman is from DC comics." The LLM-mined positive passage (e.g., with a highest relevance score) is "The Batman is an American superhero film based on the DC Comics character of the same name. Produced by DC Films and distributed by Warner Bros. Pictures, it is a reboot of the Batman film franchise." The LLM-mined positive passage is different from the seed passage. The LLM-mined negative passage (e.g., with a lowest relevance score) is ""One of my employees wants to dress up in Batman attire," Gaskins said. "As long as he's at work, I told him it was fine." New York Times News Service contributed to this report."

In some embodiments, the synthetic training dataset 520 may include the plurality of predicted task-query pairs, the respective first collection of positive passages, and the respective second collection of negative passages. For example, the FRet dataset may be generated by combining the generation results along with the positive and negative mining. In some embodiments, the FRet dataset may include 6.6 million (M) examples, each containing a task, a query, a positive passage, and a negative passage.

Model Training & Inference

Some embodiments involve providing, to an embedding model, each task-query pair, the respective first collection of positive passages, and the respective second collection of negative passages. Such embodiments involve causing the embedding model to be trained to embed a given input task-query pair near positive passages and away from negative passages.

Figure 7:
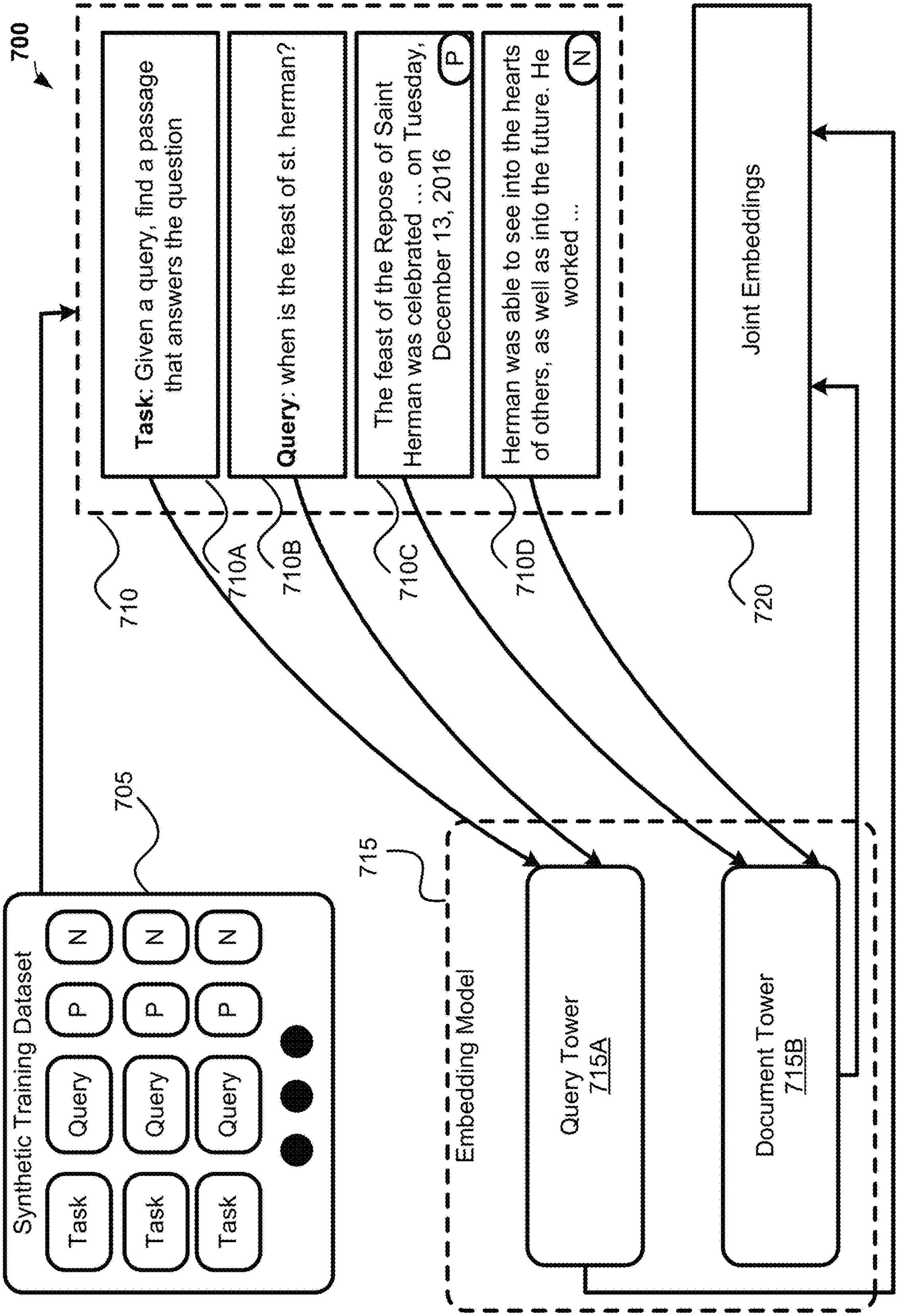
FIG. 7 illustrates an example training process for an embedding model, in accordance with example embodiments.

FIG. 7 illustrates an example training process 700 for an embedding model, in accordance with example embodiments. In some embodiments, synthetic training dataset 705 may include a plurality of predicted task-query pairs, a respective positive passage, and a respective hard negative passage. For example, a task 710A may be "Given a query, find a passage that answers the question." A particular data item 710 may be (Task, Query, P, N) where P denotes a positive passage and N denotes a hard negative passage. An example query 710B relevant to task 710A may be "when is the feast of st. herman?" A positive passage 710C may be "The feast of the Repose of Saint Herman was celebrated . . . on Tuesday, Dec. 13, 2016," and a hard negative message 710D may be "Herman was able to see into the hearts of others, as well as into the future. He worked . . . "

In some embodiments, the synthetic training dataset 705 may be used to train an embedding model 715. In some embodiments, For example, embedding model 715 may be a text embedding model. In some embodiments, the embedding model may be a dual encoder including a query tower and a document tower, wherein the query tower is trained to embed the task-query pair, and wherein the document tower is trained to embed the positive passages and negative passages. For example, a standard dual encoder may be trained with the data item 710 including (Task, Query, P, N). The embedding model 715 may include a query tower 715A and a document tower 715B, as indicated below:

Query tower: task+query

Document tower: (optionally, title)+passage

In some embodiments, a subplurality of the plurality of passages comprise a respective title, and wherein the document tower is trained to embed the respective title. For example, the task 710A and query 710B may be embedded in query tower 715A. Also, for example, the positive passage 710C and the hard negative passage 710D may be embedded in document tower 715B.

In some embodiments, the embedding model 715 may generate joint embeddings 720. For example, the embedding model 715 may be trained to embed a given input task-query pair (e.g., task 710A and query 710B) near corresponding positive passages (e.g., positive passage 710C) and away from corresponding negative passages (e.g., hard negative passage 710D). Various types of similarity measures (e.g., cosine similarity) may be used to determine mutual distances.

In some embodiments, the embedding model 715 may be trained with noise-contrastive estimation (NCE) loss using in-batch random negatives. The embedding model 715 may be initialized with pre-trained LLMs such as T5. In some embodiments, the title feature may be kept empty so that the embedding model 715 may focus on the content (e.g., content of the passage) of a given document. In some embodiments, the query tower 715A and the document tower 715B may be trained independently.

In some embodiments, during an inference phase, a task description may be added for each query, thereby making the embeddings reflect the task, while maintaining the same format as training.

Evaluation may be performed in several ways. For example, Benchmarking IR (BEIR) may be used. BEIT is a heterogeneous benchmark for zero-shot evaluation, and includes different information retrieval (IR) tasks. Also, for example, Massive Text Embedding Benchmark (MTEB) may be used, which is a massive benchmark for measuring the performance of text embedding models on diverse embedding tasks.

Cross-lingual Synthetic Datasets

Figure 8:
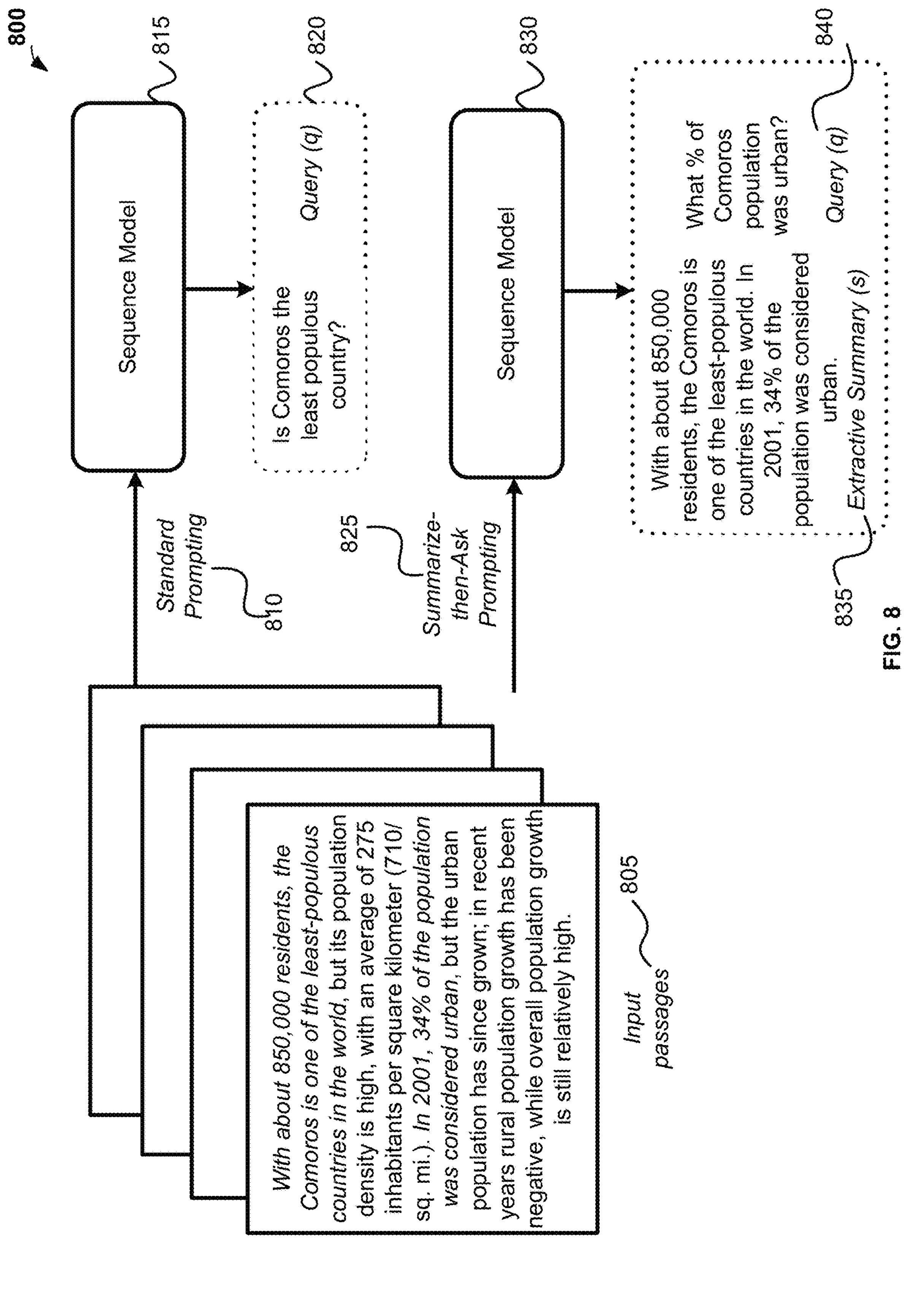
FIG. 8 illustrates a Summarize-then-Ask Prompting (SAP) process, in accordance with example embodiments.

FIG. 8 illustrates a Summarize-then-Ask Prompting (SAP) process 800, in accordance with example embodiments. An illustration of SAP versus standard prompting for English query generation is illustrated. Input passages 805 may be sampled from a corpus of passages (e.g., a web corpus). In standard prompting 810, a sequence model 815 generates query 820.

SAP 825 assists a sequence model 830 in improving the query generation quality by identifying relevant sections of the input passage (italicized portions) via an extractive summary 835 as an intermediate reasoning step to generate enhanced query 840.

For example, to generate extractive summary 835, sequence model 830 constructs an extractive summary $e_s$ of the input passage $p_s$, where s denotes a source language. The extractive summary 835 captures the highly relevant information contained within the passage $p_s$ (which may occasionally be long) acting as a useful intermediate signal for sequence model 830 to generate a multilingual query in a later stage. The first stage may be denoted as $e_s$=LLM($p_s$; $\theta_1, \ldots, \theta_k$), where ($\theta_1, \ldots, \theta_k$) denotes the k few-shot prompt exemplars containing the passage, a summary in the source language s and the query in the target language t.

To generate enhanced query 840, sequence model 830 combines the summary $e_s$ generated previously with the original input passage $p_s$, highlighting the relevant information required for composing the query $q_t$ in the target language t. This stage may be denoted as $q_t$=LLM($e_s$, $p_s$; $\theta_1, \ldots, \theta_k$), where extractive summary $e_s$, input passage $p_s$ and k-shot exemplars appear from the first stage.

The generation of SWIM-IR involves an unlabeled corpus of passages and few-shot exemplars. An overview of the cross-lingual generation procedure is shown in FIG. 9.

Figure 9:
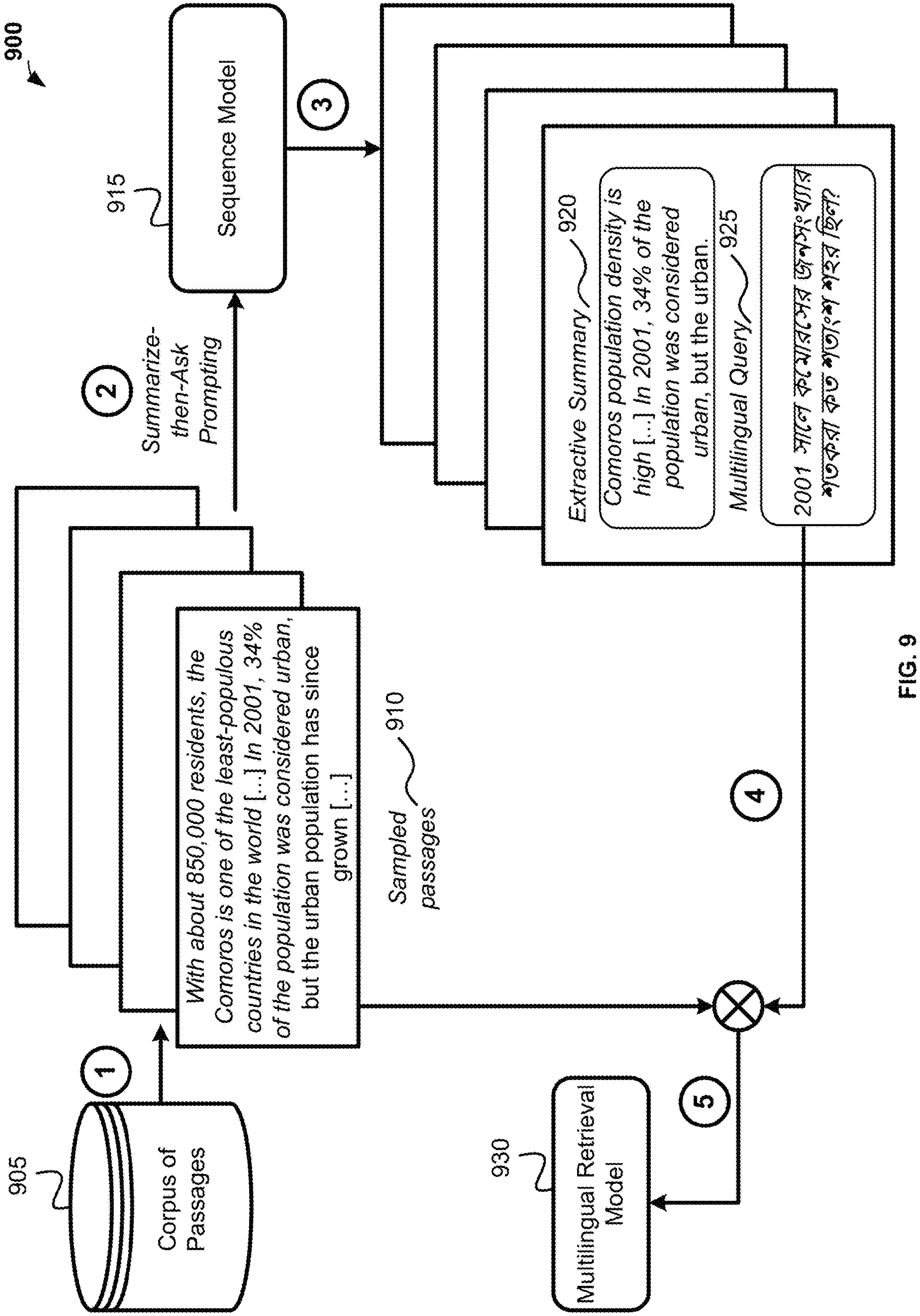
FIG. 9 illustrates a cross-lingual synthetic dataset generation process, in accordance with example embodiments.

FIG. 9 illustrates a cross-lingual synthetic dataset generation process 900, in accordance with example embodiments. At step 1, N passages 910 may be sampled from a corpus of passages 905 (e.g., a web corpus in English) using stratified sampling for each language out of L target languages. At step 2, an SAP may be performed and a sampled passage may be input to sequence model 915, along with the few-shot exemplars to the LLM with SAP. At steps 3 and 4, the output from sequence model 915 may be parsed to receive the synthetic query 925 in the target language (e.g., in Bengali), along with the extractive summary 920 in the source language (e.g., English). At step 5, a multilingual dense retriever model 930 (also sometimes referred to herein as SWIM-X) may be fine-tuned with training pairs combined for all target languages. For example, the training pairs would include N×L pairs for the N passages 910 and the L target languages.

For cross-lingual dataset generation, the goal is to generate a query in the target language t using the input passage in English (source language s). In some embodiments, a stratified sampling algorithm may be used to sample a maximum of one million passages for each target language t from the corpus of passages 905 (e.g., English WIKIPEDIA® corpus used in XOR-Retrieve or XTREME-UP). In some embodiments, five prompt exemplars may be provided and a summary and a query for the exemplar may be manually prepared in English. A translation service (e.g., GOOGLE® Translate) may be used to translate the exemplar queries across other target languages. Finally, the prompt may be constructed, by providing the query generation task as an instruction, include the target language, and the 5-shot exemplars as an input to sequence model 915 with SAP.

As described herein, a stratified sampling technique is used to select a subset of passages from the corpus of passages, aiming for a relatively uniform distribution of training samples across all languages. A WIKIPEDIA® corpus generally contains entities that are sorted alphabetically (A-Z). An inclusion threshold $I_{th}$ may be determined, where $I_{th}=D_{sample}/D_{total}$, where $D_{sample}$ denotes a number of passages required to sample and $D_{total}$ denotes a total number of passages in the corpus. For each passage $p_i$ in the corpus, an inclusion probability $\hat{p}_i \in [0,1]$ may be randomly generated. The passage $p_i$ may be selected when the condition $\hat{p}_i \leq I_{th}$ is satisfied. The stratified sampling approach ensures a uniform sampling of passages with Wikipedia entities between all letters (A-Z).

For mono-lingual dataset generation, the goal is to generate a query in the same language as the input passage (s=t). An approach similar to the cross-lingual task may be used. For example, one million passages (if available) may be sampled for each language-specific corpus (e.g., WIKIPEDIA® corpus in MIRACL). In some embodiments, three training pairs may be carefully selected as prompt exemplars. For languages with no training split, the prompt exemplars may be manually constructed. Further, a summarization service (e.g., GOOGLE® BARD) may be used to generate exemplar summaries in the target language. Subsequently, the prompt may be constructed by explaining the query generation task as an instruction, and providing the 5-shot exemplars with SAP.

As described herein, large, high-quality, and substantially compliant datasets for instruction-tuning embedding models are provided, through synthetic data generation from sequence models. Models trained with the methodologies described herein may be deployed on a cloud server. For example, a model trained with this methodology can be deployed on a unified machine-learning platform that helps clients build, deploy, and/or scale machine-learning models (e.g., Vertex AI). Generative AI (GenAI) support in Vertex AI can make it easier for developers and data scientists to access, customize, and/or deploy foundation models from a simple user interface. In some embodiments, features of the dataset generation, training, and/or deployment of models may be provided via an application programming interface (API).

Training Machine Learning Models for Generating Inferences/Predictions

Figure 10:
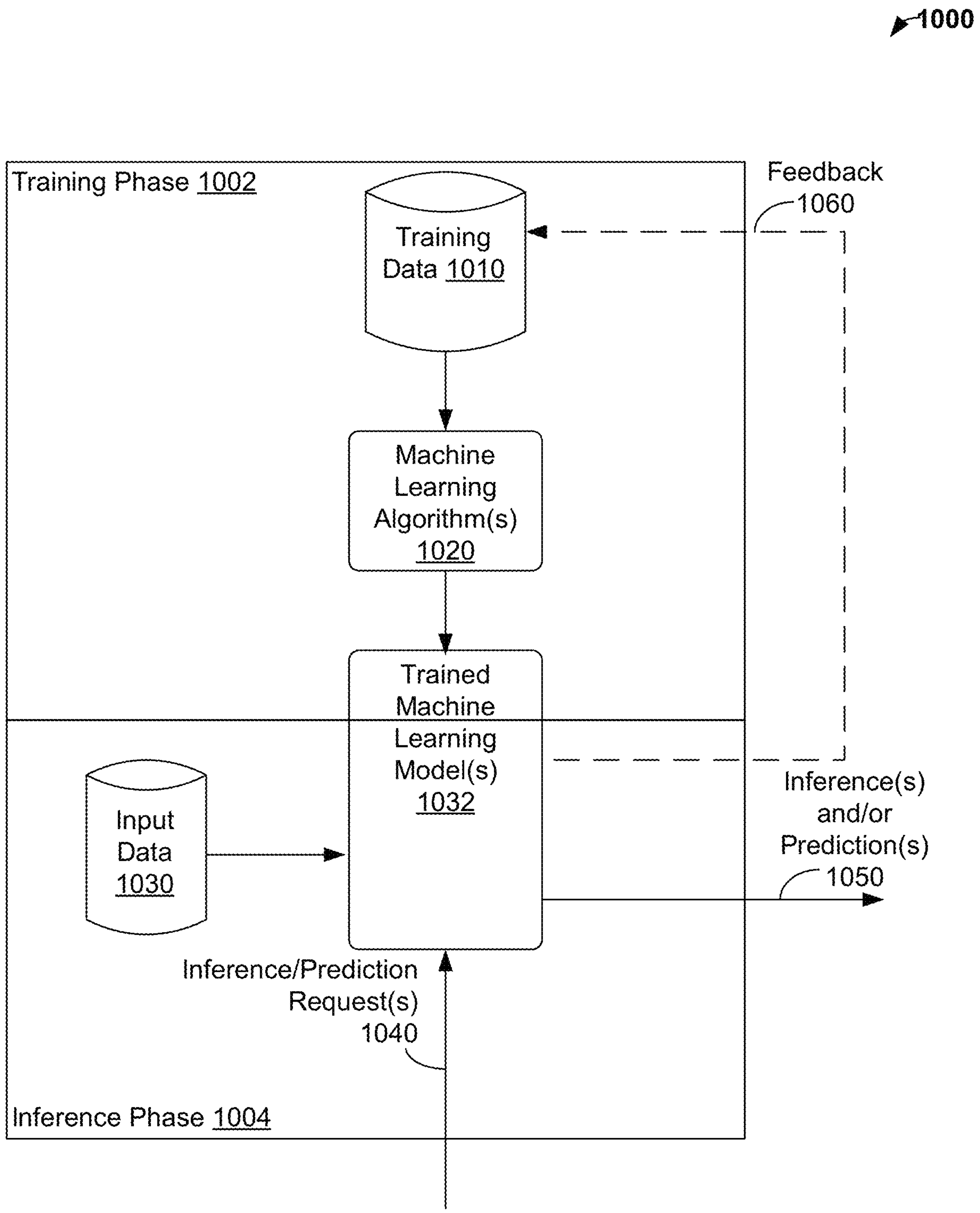
FIG. 10 is a diagram illustrating training and inference phases of a machine learning model, in accordance with example embodiments.

FIG. 10 shows diagram 1000 illustrating a training phase 1002 and an inference phase 1004 of trained machine learning model(s) 1032, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 10 shows training phase 1002 where one or more machine learning algorithms 1020 are being trained on training data 1010 to become trained machine learning model(s) 1032. Then, during inference phase 1004, trained machine learning model(s) 1032 can receive input data 1030 and one or more inference/prediction requests 1040 (perhaps as part of input data 1030) and responsively provide as an output one or more inferences and/or prediction(s) 1050.

For example, the one or more machine learning algorithms 1020 may include a large language model. The trained machine learning model(s) 1032 can be the respective trained versions of these one or more machine learning algorithms 1020.

As such, trained machine learning model(s) 1032 can include one or more models of one or more machine learning algorithms 1020. Machine learning algorithm(s) 1020 may include, but are not limited to: an artificial neural network (e.g., convolutional neural networks, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 1020 may be supervised or unsupervised, and may implement any suitable combination of online and offline learning.

In some examples, machine learning algorithm(s) 1020 and/or trained machine learning model(s) 1032 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 1020 and/or trained machine learning model(s) 1032. In some examples, trained machine learning model(s) 1032 can be trained, can reside on, and be executed to provide inferences on a particular computing device, and/or otherwise can make inferences for the particular computing device.

During training phase 1002, machine learning algorithm(s) 1020 can be trained by providing at least training data 1010 as training input using unsupervised, supervised, semi-supervised, and/or reinforcement learning techniques. Unsupervised learning involves providing a portion (or all) of training data 1010 to machine learning algorithm(s) 1020 and machine learning algorithm(s) 1020 determining one or more output inferences based on the provided portion (or all) of training data 1010. Supervised learning involves providing a portion of training data 1010 to machine learning algorithm(s) 1020, with machine learning algorithm(s) 1020 determining one or more output inferences based on the provided portion of training data 1010, and the output inference(s) are either accepted or corrected based on correct results associated with training data 1010. In some examples, supervised learning of machine learning algorithm(s) 1020 can be governed by a set of rules and/or a set of labels for the training input, and the set of rules and/or set of labels may be used to correct inferences of machine learning algorithm(s) 1020.

Semi-supervised learning involves having correct results for part, but not all, of training data 1010. During semi-supervised learning, supervised learning is used for a portion of training data 1010 having correct results, and unsupervised learning is used for a portion of training data 1010 not having correct results. Reinforcement learning involves machine learning algorithm(s) 1020 receiving a reward signal regarding a prior inference, where the reward signal can be a numerical value. During reinforcement learning, machine learning algorithm(s) 1020 can output an inference and receive a reward signal in response, where machine learning algorithm(s) 1020 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 1020 and/or trained machine learning model(s) 1032 can be trained using other machine learning techniques, including but not limited to, incremental learning and curriculum learning.

In some examples, machine learning algorithm(s) 1020 and/or trained machine learning model(s) 1032 can use transfer learning techniques. For example, transfer learning techniques can involve trained machine learning model(s) 1032 being pre-trained on one set of data and additionally trained using training data 1010. More particularly, machine learning algorithm(s) 1020 can be pre-trained on data from one or more computing devices and a resulting trained machine learning model provided to computing device CD1, where CD1 is intended to execute the trained machine learning model during inference phase 1004. Then, during training phase 1002, the pre-trained machine learning model can be additionally trained using training data 1010, where training data 1010 can be derived from kernel and non-kernel data of computing device CD1. This further training of the machine learning algorithm(s) 1020 and/or the pre-trained machine learning model using training data 1010 of CD1's data can be performed using either supervised or unsupervised learning. Once machine learning algorithm(s) 1020 and/or the pre-trained machine learning model has been trained on at least training data 1010, training phase 1002 can be completed. The trained resulting machine learning model can be utilized as at least one of trained machine learning model(s) 1032.

In particular, once training phase 1002 has been completed, trained machine learning model(s) 1032 can be provided to a computing device, if not already on the computing device. Inference phase 1004 can begin after trained machine learning model(s) 1032 are provided to computing device CD1.

During inference phase 1004, trained machine learning model(s) 1032 can receive input data 1030 and generate and output one or more corresponding inferences and/or prediction(s) 1050 about input data 1030. As such, input data 1030 can be used as an input to trained machine learning model(s) 1032 for providing corresponding inference(s) and/or prediction(s) 1050 to kernel components and non-kernel components. For example, trained machine learning model(s) 1032 can generate inference(s) and/or prediction(s) 1050 in response to one or more inference/prediction requests 1040. In some examples, trained machine learning model(s) 1032 can be executed by a portion of other software. For example, trained machine learning model(s) 1032 can be executed by an inference or prediction daemon to be readily available to provide inferences and/or predictions upon request. Input data 1030 can include data from computing device CD1 executing trained machine learning model(s) 1032 and/or input data from one or more computing devices other than CD1.

Input data 1030 can include training data described herein, such as synthetic data generated from a text corpus.

Inference(s) and/or prediction(s) 1050 can include task outputs, numerical values, and/or other output data produced by trained machine learning model(s) 1032 operating on input data 1030 (and training data 1010). In some examples, trained machine learning model(s) 1032 can use output inference(s) and/or prediction(s) 1050 as input feedback 1050. Trained machine learning model(s) 1032 can also rely on past inferences as inputs for generating new inferences.

After training, the trained version of the neural network can be an example of trained machine learning model(s) 1032. In this approach, an example of the one or more inference/prediction request(s) 1040 can be a request to generate synthetic queries from passages for training a text embedding model, and a corresponding example of inferences and/or prediction(s) 1050 can be predicted synthetic queries.

In some examples, one computing device CD_SOLO can include the trained version of the neural network, perhaps after training. Then, the computing device CD_SOLO can receive a request to predict an output, and use the trained version of the neural network to predict the output.

In some examples, two or more computing devices CD_CLI and CD_SRV can be used to provide output; e.g., a first computing device CD_CLI can generate a request to predict an output and send the request to a second computing device CD_SRV. Then, CD_SRV can use the trained version of the neural network, to predict the output, and respond to the requests from CD_CLI. Then, upon reception of responses to the requests, CD_CLI can provide the requested output.

Example Data Network

Figure 11:
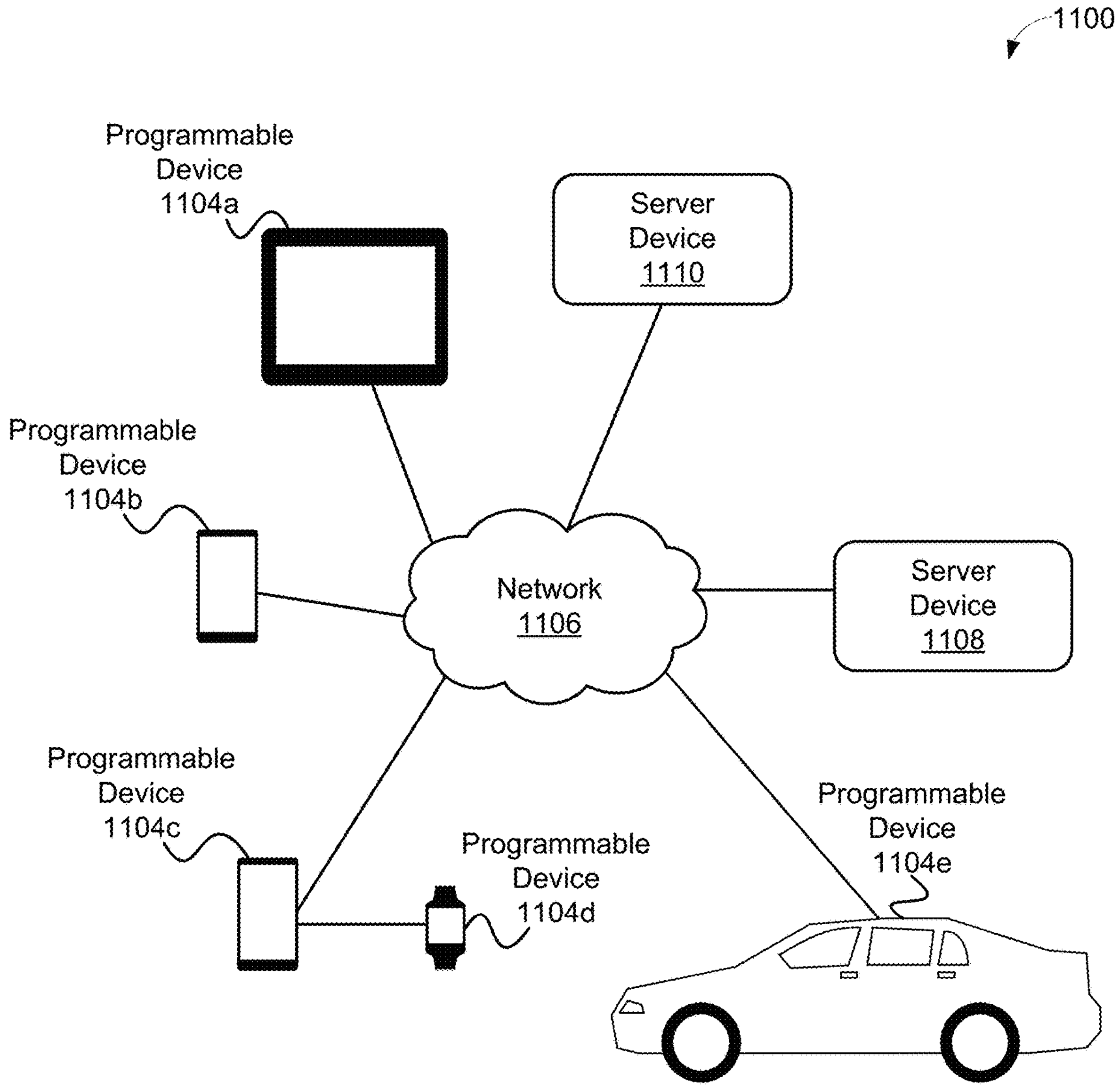
FIG. 11 depicts a distributed computing architecture, in accordance with example embodiments.

FIG. 11 depicts a distributed computing architecture 1100, in accordance with example embodiments. Distributed computing architecture 1100 includes server devices 1108, 1110 that are configured to communicate, via network 1106, with programmable devices 1104*a*, 1104*b*, 1104*c*, 1104*d*, 1104*c*. Network 1106 may correspond to a local area network (LAN), a wide area network (WAN), a WLAN, a WWAN, a corporate intranet, the public Internet, or any other type of network configured to provide a communications path between networked computing devices. Network 1106 may also correspond to a combination of one or more LANs, WANs, corporate intranets, and/or the public Internet.

Although FIG. 11 only shows five programmable devices, distributed application architectures may serve tens, hundreds, or thousands of programmable devices. Moreover, programmable devices 1104*a*, 1104*b*, 1104*c*, 1104*d*, 1104*c* (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 1104*a*, 1104*b*, 1104*c*, 1104*e*, programmable devices can be directly connected to network 1106. In other examples, such as illustrated by programmable device 1104*d*, programmable devices can be indirectly connected to network 1106 via an associated computing device, such as programmable device 1104*c*. In this example, programmable device 1104*c* can act as an associated computing device to pass electronic communications between programmable device 1104*d* and network 1106. In other examples, such as illustrated by programmable device 1104*e*, a computing device can be part of and/or inside a vehicle, such as a car, a truck, a bus, a boat or ship, an airplane, etc. In other examples not shown in FIG. 11, a programmable device can be both directly and indirectly connected to network 1106.

Server devices 1108, 1110 can be configured to perform one or more services, as requested by programmable devices 1104*a*-1104*e*. For example, server device 1108 and/or 1110 can provide content to programmable devices 1104*a*-1104*c*. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1108 and/or 1110 can provide programmable devices 1104*a*-1104*e* with access to software for database, search, computation, graphical, audio, video, World Wide Web/Internet utilization, and/or other functions. Many other examples of server devices are possible as well.

Computing Device Architecture

Figure 12:
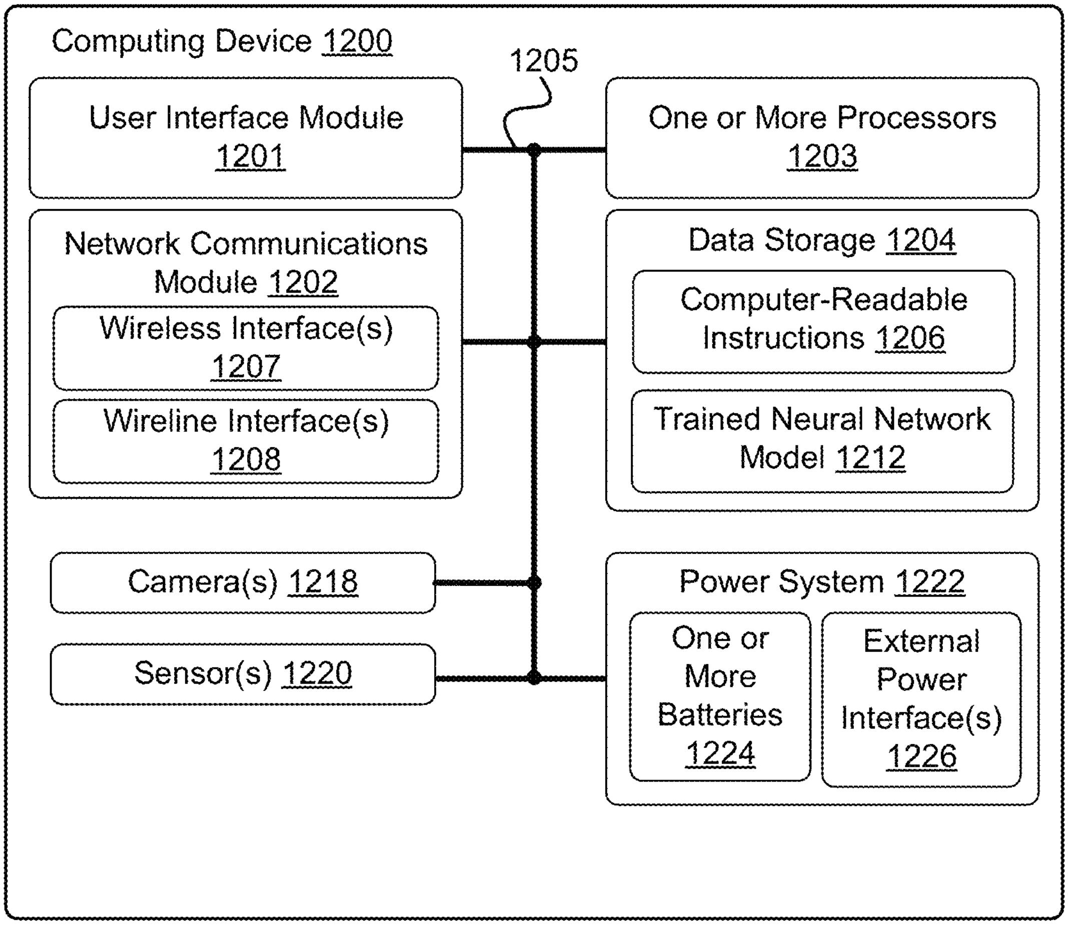
FIG. 12 is a block diagram of a computing device, in accordance with example embodiments.

FIG. 12 is a block diagram of an example computing device 1200, in accordance with example embodiments. In particular, computing device 1200 shown in FIG. 12 can be configured to perform at least one function of and/or related to the neural networks described herein.

Computing device 1200 may include a user interface module 1201, a network communications module 1202, one or more processors 1203, data storage 1204, one or more camera(s) 1218, one or more sensors 1220, and power system 1222, all of which may be linked together via a system bus, network, or other connection mechanism 1205.

User interface module 1201 can be operable to send data to and/or receive data from external user input/output devices. For example, user interface module 1201 can be configured to send and/or receive data to and/or from user input devices such as a touch screen, a computer mouse, a keyboard, a keypad, a touch pad, a trackball, a joystick, a voice recognition module, and/or other similar devices. User interface module 1201 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1201 can also be configured to generate audible outputs, with devices such as a speaker, speaker jack, audio output port, audio output device, earphones, and/or other similar devices. User interface module 1201 can further be configured with one or more haptic devices that can generate haptic outputs, such as vibrations and/or other outputs detectable by touch and/or physical contact with computing device 1200. In some examples, user interface module 1201 can be used to provide a graphical user interface (GUI) for utilizing computing device 1200, such as, for example, a graphical user interface of a mobile phone device.

Network communications module 1202 can include one or more devices that provide one or more wireless interface(s) 1207 and/or one or more wireline interface(s) 1208 that are configurable to communicate via a network. Wireless interface(s) 1207 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 1208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 1202 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1203 can include one or more general purpose processors, and/or one or more special purpose processors (e.g., digital signal processors, tensor processing units (TPUs), graphics processing units (GPUs), application specific integrated circuits, etc.). One or more processors 1203 can be configured to execute computer-readable instructions 1206 that are contained in data storage 1204 and/or other instructions as described herein.

Data storage 1204 can include one or more non-transitory computer-readable storage media that can be read and/or accessed by at least one of one or more processors 1203. The one or more computer-readable storage media can include volatile and/or non-volatile storage components, such as optical, magnetic, organic or other memory or disc storage, which can be integrated in whole or in part with at least one of one or more processors 1203. In some examples, data storage 1204 can be implemented using a single physical device (e.g., one optical, magnetic, organic or other memory or disc storage unit), while in other examples, data storage 1204 can be implemented using two or more physical devices.

Data storage 1204 can include computer-readable instructions 1206 and perhaps additional data. In some examples, data storage 1204 can include storage required to perform at least part of the herein-described methods, scenarios, and techniques and/or at least part of the functionality of the herein-described devices and networks. In some examples, data storage 1204 can include storage for a trained neural network model 1212 (e.g., a model of trained neural networks such as neural network models described herein). In particular of these examples, computer-readable instructions 1206 can include instructions that, when executed by one or more processors 1203, enable computing device 1200 to provide for some or all of the functionality of trained neural network model 1212.

In some examples, computing device 1200 can include one or more camera(s) 1218. Camera(s) 1218 can include one or more image capture devices, such as still and/or video cameras, equipped to capture light and record the captured light in one or more images; that is, camera(s) 1218 can generate image(s) of captured light. The one or more images can be one or more still images and/or one or more images utilized in video imagery. Camera(s) 1218 can capture light and/or electromagnetic radiation emitted as visible light, infrared radiation, ultraviolet light, and/or as one or more other frequencies of light.

In some examples, computing device 1200 can include one or more sensors 1220. Sensors 1220 can be configured to measure conditions within computing device 1200 and/or conditions in an environment of computing device 1200 and provide data about these conditions. For example, sensors 1220 can include one or more of: (i) sensors for obtaining data about computing device 1200, such as, but not limited to, a thermometer for measuring a temperature of computing device 1200, a battery sensor for measuring power of one or more batteries of power system 1222, and/or other sensors measuring conditions of computing device 1200; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 1200, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 1200, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 1200, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1220 are possible as well.

Power system 1222 can include one or more batteries 1224 and/or one or more external power interfaces 1226 for providing electrical power to computing device 1200. Each battery of the one or more batteries 1224 can, when electrically coupled to the computing device 1200, act as a source of stored electrical power for computing device 1200. One or more batteries 1224 of power system 1222 can be configured to be portable. Some or all of one or more batteries 1224 can be readily removable from computing device 1200. In other examples, some or all of one or more batteries 1224 can be internal to computing device 1200, and so may not be readily removable from computing device 1200. Some or all of one or more batteries 1224 can be rechargeable. For example, a rechargeable battery can be recharged via a wired connection between the battery and another power supply, such as by one or more power supplies that are external to computing device 1200 and connected to computing device 1200 via the one or more external power interfaces. In other examples, some or all of one or more batteries 1224 can be non-rechargeable batteries.

One or more external power interfaces 1226 of power system 1222 can include one or more wired-power interfaces, such as a USB cable and/or a power cord, that enable wired electrical power connections to one or more power supplies that are external to computing device 1200. One or more external power interfaces 1226 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 1226, computing device 1200 can draw electrical power from the external power source the established electrical power connection. In some examples, power system 1222 can include related sensors, such as battery sensors associated with the one or more batteries or other types of electrical power sensors.

Cloud-Based Servers

Figure 13:
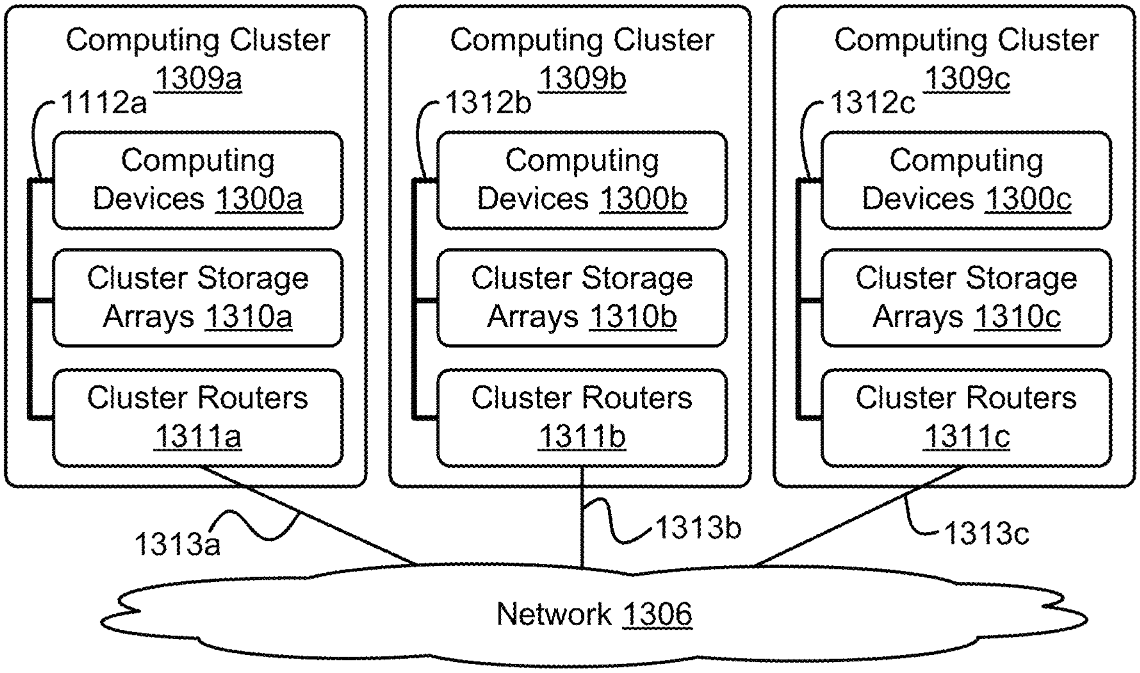
FIG. 13 depicts a network of computing clusters arranged as a cloud-based server system, in accordance with example embodiments.

FIG. 13 depicts a cloud-based server system in accordance with an example embodiment. In FIG. 13, functionality of a neural network, and/or a computing device can be distributed among computing clusters 1309*a*, 1309*b*, 1309*c*. Computing cluster 1309*a* can include one or more computing devices 1300*a*, cluster storage arrays 1310*a*, and cluster routers 1311*a* connected by a local cluster network 1313*a*. Similarly, computing cluster 1309*b* can include one or more computing devices 1300*b*, cluster storage arrays 1310*b*, and cluster routers 1311*b* connected by a local cluster network 1313*b*. Likewise, computing cluster 1309*c* can include one or more computing devices 1300*c*, cluster storage arrays 1310*c*, and cluster routers 1311*c* connected by a local cluster network 1313*c*.

In some embodiments, computing clusters 1309*a*, 1309*b*, 1309*c* can be a single computing device residing in a single computing center. In other embodiments, computing clusters 1309*a*, 1309*b*, 1309*c* can include multiple computing devices in a single computing center, or even multiple computing devices located in multiple computing centers located in diverse geographic locations. For example, FIG. 13 depicts each of computing clusters 1309*a*, 1309*b*, 1309*c* residing in different physical locations.

In some embodiments, data and services at computing clusters 1309*a*, 1309*b*, 1309*c* can be encoded as computer readable information stored in non-transitory, tangible computer readable media (or computer readable storage media) and accessible by other computing devices. In some embodiments, computing clusters 1309*a*, 1309*b*, 1309*c* can be stored on a single disk drive or other tangible storage media, or can be implemented on multiple disk drives or other tangible storage media located at one or more diverse geographic locations.

In some embodiments, each of computing clusters 1309*a*, 1309*b*, and 1309*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1309*a*, for example, computing devices 1300*a* can be configured to perform various computing tasks of a conditioned, axial self-attention based neural network, and/or a computing device. In one embodiment, the various functionalities of a neural network, and/or a computing device can be distributed among one or more of computing devices 1300*a*, 1300*b*, 1300*c*. Computing devices 1300*b* and 1300*c* in respective computing clusters 1309*b* and 1309*c* can be configured similarly to computing devices 1300*a* in computing cluster 1309*a*. On the other hand, in some embodiments, computing devices 1300*a*, 1300*b*, and 1300*c* can be configured to perform different functions.

In some embodiments, computing tasks and stored data associated with a neural network, and/or a computing device can be distributed across computing devices 1300*a*, 1300*b*, and 1300*c* based at least in part on the processing requirements of a neural network, and/or a computing device, the processing capabilities of computing devices 1300*a*, 1300*b*, 1300*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 1310*a*, 1310*b*, 1310*c* of computing clusters 1309*a*, 1309*b*, 1309*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a conditioned, axial self-attention based neural network, and/or a computing device can be distributed across computing devices 1300*a*, 1300*b*, 1300*c* of computing clusters 1309*a*, 1309*b*, 1309*c*, various active portions and/or backup portions of these components can be distributed across cluster storage arrays 1310*a*, 1310*b*, 1310*c*. For example, some cluster storage arrays can be configured to store one portion of the data of a first layer of a neural network, and/or a computing device, while other cluster storage arrays can store other portion(s) of data of second layer of a neural network, and/or a computing device. Also, for example, some cluster storage arrays can be configured to store the data of an encoder of a neural network, while other cluster storage arrays can store the data of a decoder of a neural network. Additionally, some cluster storage arrays can be configured to store backup versions of data stored in other cluster storage arrays.

Cluster routers 1311*a*, 1311*b*, 1311*c* in computing clusters 1309*a*, 1309*b*, 1309*c* can include networking equipment configured to provide internal and external communications for the computing clusters. For example, cluster routers 1311*a* in computing cluster 1309*a* can include one or more internet switching and routing devices configured to provide (i) local area network communications between computing devices 1300*a* and cluster storage arrays 1310*a* via local cluster network 1313A, and (ii) wide area network communications between computing cluster 1309*a* and computing clusters 1309*b* and 1309*c* via wide area network link 1313*a* to network 1106. Cluster routers 1311*b* and 1311*c* can include network equipment similar to cluster routers 1311*a*, and cluster routers 1311*b* and 1311*c* can perform similar networking functions for computing clusters 1309*b* and 1309*b* that cluster routers 1311*a* perform for computing cluster 1309*a*.

In some embodiments, the configuration of cluster routers 1311*a*, 1311*b*, 1311*c* can be based at least in part on the data communication requirements of the computing devices and cluster storage arrays, the data communications capabilities of the network equipment in cluster routers 1311*a*, 1311*b*, 1311*c*, the latency and throughput of local cluster networks 1313A, 1313B, 1313C, the latency, throughput, and cost of wide area network links 1313*a*, 1313*b*, 1313*c*, and/or other factors that can contribute to the cost, speed, fault-tolerance, resiliency, efficiency and/or other design criteria of the moderation system architecture.

Example Methods of Operation

FIG. 14 is a flowchart of a method 1400, in accordance with example embodiments. Method 1400 can be executed by a computing device, such as computing device 1200. Method 1400 can begin at block 1410, where the method involves providing, to a sequence model (i) a plurality of few-shot prompts, wherein each prompt comprises a demonstration passage, a demonstration task, and a demonstration query, wherein the demonstration task describes a type of retrieval, and wherein the demonstration query is relevant to the demonstration task, and (ii) a plurality of passages sampled from a corpus of passages.

At block 1420, the method involves receiving, from the sequence model and for the plurality of passages and based on the plurality of few-shot prompts, a respective plurality of predicted task-query pairs, the sequence model having been prompted to predict a task based on an input passage, and predict an output query relevant to the predicted task.

At block 1430, the method involves generating a synthetic training dataset comprising the plurality of passages and the respective plurality of predicted task-query pairs.

At block 1440, the method involves providing the synthetic training dataset.

Some embodiments involve providing the plurality of predicted task-query pairs to a passage retrieval model, the passage retrieval model having been trained to output, for a given predicted task-query pair, respective one or more nearest neighbor passages of the corpus of passages.

Some embodiments involve receiving, from the passage retrieval model and for the plurality of predicted task-query pairs, the respective one or more nearest neighbor passages. Such embodiments involve providing, to a second sequence model, the plurality of predicted task-query pairs, and the respective one or more nearest neighbor passages. Such embodiments further involve receiving, from the second sequence model and for each predicted passage of the one or more predicted nearest neighbor passages, an associated relevance score indicative of a relevance of the predicted passage to a predicted query. Such embodiments also involve classifying, for each task-query pair of the plurality of predicted task-query pairs and based on associated relevance scores, the one or more nearest neighbor passages into a first collection of positive passages and a second collection of negative passages, wherein a positive passage is indicative of a high relevance to a predicted query, and wherein a negative passage is indicative of a low relevance to the predicted query. The synthetic training dataset includes the plurality of predicted task-query pairs, the respective first collection of positive passages, and the respective second collection of negative passages.

In some embodiments, the classifying involves applying one or more few-shot prompted ranking functions.

In some embodiments, the one or more few-shot prompted ranking functions include query likelihood or relevance classification.

Some embodiments involve providing, to an embedding model, each task-query pair, the respective first collection of positive passages, and the respective second collection of negative passages. Such embodiments involve causing the embedding model to be trained to embed a given input task-query pair near positive passages and away from negative passages.

In some embodiments, the embedding model may be a dual encoder including a query tower and a document tower, wherein the query tower is trained to embed the task-query pair, and wherein the document tower is trained to embed the positive passages and negative passages.

In some embodiments, a subplurality of the plurality of passages comprise a respective title, and wherein the document tower is trained to embed the respective title.

Some embodiments involve receiving an input query. Such embodiments involve providing the input query to the trained embedding model, wherein the trained embedding model determines a task description based on the input query, and predicts an output passage responsive to the input query and the task description. Such embodiments also involve receiving, from the trained embedding model, the output passage.

In some embodiments, the task description may relate to one or more of a question-answering task, a search task, a document retrieval task, a fact-checking task, or a semantic sentence similarity task.

In some embodiments, a particular predicted task of the plurality of predicted task-query pairs may be different from the plurality of demonstration tasks provided to the sequence model.

Some embodiments involve applying a beam search algorithm to cause the sequence model to predict two or more queries.

Some embodiments involve filtering the corpus of passages to remove passages that do not conform to content standards, and wherein the plurality of passages are sampled from the filtered corpus of passages.

In some embodiments, the filtering may be performed by a machine learning model trained based on the content standards.

In some embodiments, the sequence model may be a large multimodal model.

In some embodiments, the sequence model may be a large language model.

In some embodiments, the sequence model may be a large multilingual model.

Some embodiments involve formatting the synthetic training dataset as a standard symmetric dataset.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being associated with the following claims.

What is claimed is:

1. A computer-implemented method for generating a synthetic training dataset to fine-tune an embedding model, comprising:

providing, by a processor, to a sequence model (i) a plurality of few-shot prompts, wherein each prompt comprises a demonstration passage, a demonstration task, and a demonstration query, wherein the demonstration task describes a type of retrieval, and wherein the sequence model has been trained to align the demonstration query with the demonstration task, and (ii) a plurality of passages sampled from a corpus of passages;

receiving, by the processor, from the sequence model and for the plurality of passages and based on the plurality of few-shot prompts, a respective plurality of predicted task-query pairs, by automatically prompting the sequence model to select a retrieval task type from a plurality of retrieval task types based on an input passage to predict a task based on the input passage, and predict an output query for the predicted task;

generating, by the processor, a synthetic training dataset comprising the plurality of passages and the respective plurality of predicted task-query pairs for use in fine-tuning the embedding model, and wherein the generating of the synthetic training dataset further comprises determining a global positive passage for a generated query by selecting a target passage from the corpus of passages that differs from the input passage used to generate the query and has a higher relevance score than the input passage based on a fusion ensemble of a query likelihood scoring and a relevance classification scoring, wherein the query likelihood scoring indicates a likelihood of a given generated query for a given passage, and wherein the relevance classification scoring indicates a likelihood of a given relevance label for the given generated query and the given passage; and providing, by the processor, the synthetic training dataset to the embedding model.

2. The computer-implemented method of claim 1, further comprising:

providing the plurality of predicted task-query pairs to a passage retrieval model, the passage retrieval model having been trained to output, for a given predicted task-query pair, respective one or more nearest neighbor passages of the corpus of passages.

3. The computer-implemented method of claim 2, further comprising:

receiving, from the passage retrieval model and for the plurality of predicted task-query pairs, the respective one or more nearest neighbor passages;

providing, to a second sequence model, the plurality of predicted task-query pairs, and the respective one or more nearest neighbor passages;

receiving, from the second sequence model and for each predicted passage of the one or more predicted nearest neighbor passages, an associated relevance score indicative of a relevance of the predicted passage to a predicted query;

classifying, for each task-query pair of the plurality of predicted task-query pairs and based on associated relevance scores, the one or more nearest neighbor passages into a first collection of positive passages and a second collection of negative passages, wherein a positive passage is indicative of a high relevance to a predicted query, and wherein a negative passage is indicative of a low relevance to the predicted query, and wherein the synthetic training dataset comprises the plurality of predicted task-query pairs, the respective first collection of positive passages, and the respective second collection of negative passages.

4. The computer-implemented method of claim 3, wherein the classifying further comprises:

applying one or more few-shot prompted ranking functions.

5. The computer-implemented method of claim 4, wherein the one or more few-shot prompted ranking functions comprise query likelihood or relevance classification.

6. The computer-implemented method of claim 3, further comprising:

providing, to an embedding model, each task-query pair, the respective first collection of positive passages, and the respective second collection of negative passages; and causing the embedding model to be trained to embed a given input task-query pair near positive passages and away from negative passages.

7. The computer-implemented method of claim 6, wherein the embedding model is a dual encoder comprising a query tower and a document tower, wherein the query tower is trained to embed the task-query pair, and wherein the document tower is trained to embed the positive passages and negative passages.

8. The computer-implemented method of claim 7, wherein a subplurality of the plurality of passages comprise a respective title, and wherein the document tower is trained to embed the respective title.

9. The computer-implemented method of claim 6, further comprising:

receiving an input query;

providing the input query to the trained embedding model, wherein the trained embedding model determines a task description based on the input query, and predicts an output passage responsive to the input query and the task description; and receiving, from the trained embedding model, the output passage.

10. The computer-implemented method of claim 9, wherein the task description relates to one or more of a question-answering task, a search task, a document retrieval task, a fact-checking task, or a semantic sentence similarity task.

11. The computer-implemented method of claim 1, wherein a particular predicted task of the plurality of predicted task-query pairs is different from the plurality of demonstration tasks provided to the sequence model.

12. The computer-implemented method of claim 1, further comprising:

applying a beam search algorithm to cause the sequence model to predict two or more queries.

13. The computer-implemented method of claim 1, further comprising:

filtering the corpus of passages to remove passages that do not conform to content standards, wherein the content standards are defined by a machine learning model trained to classify content based on one or more of prohibited speech, harmful content, or sensitive subjects, and wherein the plurality of passages are sampled from the filtered corpus of passages.

14. The computer-implemented method of claim 13, wherein the filtering is performed by the machine learning model trained based on the content standards.

15. The computer-implemented method of claim 1, wherein the sequence model is a large multimodal model.

16. The computer-implemented method of claim 1, wherein the sequence model is a large language model.

17. The computer-implemented method of claim 1, wherein the sequence model is a large multilingual model.

18. The computer-implemented method of claim 1, further comprising:

formatting the synthetic training dataset as a standard symmetric dataset.

19. A computing device for generating a synthetic training dataset to fine-tune an embedding model, comprising:

one or more processors; and data storage, wherein the data storage has stored thereon computer-executable instructions that, when executed by the one or more processors, cause the computing device to carry out functions comprising:

providing, by a processor, to a sequence model (i) a plurality of few-shot prompts, wherein each prompt comprises a demonstration passage, a demonstration task, and a demonstration query, wherein the demonstration task describes a type of retrieval, and wherein the sequence model has been trained to align the demonstration query with the demonstration task, and (ii) a plurality of passages sampled from a corpus of passages;

receiving, from the sequence model and for the plurality of passages and based on the plurality of few-shot prompts, a respective plurality of predicted task-query pairs, by automatically prompting the sequence model to select a retrieval task type from a plurality of retrieval task types based on an input passage to predict a task based on the input passage, and predict an output query for the predicted task;

generating a synthetic training dataset comprising the plurality of passages and the respective plurality of predicted task-query pairs for use in fine-tuning the embedding model, and wherein the generating of the synthetic training dataset further comprises determining a global positive passage for a generated query by selecting a target passage from the corpus of passages that differs from the input passage used to generate the query and has a higher relevance score than the input passage based on a fusion ensemble of a query likelihood scoring function and a relevance classification scoring function, wherein the query likelihood scoring indicates a likelihood of a given generated query for a given passage, and wherein the relevance classification scoring indicates a likelihood of a given relevance label for the given generated query and the given passage; and providing the synthetic training dataset to the embedding model.

20. An article of manufacture for generating a synthetic training dataset to fine-tune an embedding model comprising one or more non-transitory computer readable media having computer-readable instructions stored thereon that, when executed by one or more processors of a computing device, cause the computing device to carry out functions comprising:

providing, by a processor, to a sequence model (i) a plurality of few-shot prompts, wherein each prompt comprises a demonstration passage, a demonstration task, and a demonstration query, wherein the demonstration task describes a type of retrieval, and wherein the sequence model has been trained to align the demonstration query with the demonstration task, and (ii) a plurality of passages sampled from a corpus of passages;

receiving, from the sequence model and for the plurality of passages and based on the plurality of few-shot prompts, a respective plurality of predicted task-query pairs, by automatically prompting the sequence model to select a retrieval task type from a plurality of retrieval task types based on an input passage to predict a task based on the input passage, and predict an output query for the predicted task;

generating a synthetic training dataset comprising the plurality of passages and the respective plurality of predicted task-query pairs for use in fine-tuning the embedding model, and wherein the generating of the synthetic training dataset further comprises determining a global positive passage for a generated query by selecting a target passage from the corpus of passages that differs from the input passage used to generate the query and has a higher relevance score than the input passage based on a fusion ensemble of a query likelihood scoring function and a relevance classification scoring function, wherein the query likelihood scoring indicates a likelihood of a given generated query for a given passage, and wherein the relevance classification scoring indicates a likelihood of a given relevance label for the given generated query and the given passage; and providing the synthetic training dataset to the embedding model.

21. The computer-implemented method of claim 1, wherein the fusion ensemble comprises a Reciprocal Rank Fusion (RRF) ensemble.

* * * * *